United States Patent
Singh et al.

(10) Patent No.: US 11,405,183 B2
(45) Date of Patent: Aug. 2, 2022

(54) USING CACHE OBJECTS TO STORE EVENTS FOR ADDING CORRESPONDING OBJECTS IN A BLOCKCHAIN

(71) Applicant: salesforce.com, inc., San Francisco, CA (US)

(72) Inventors: Prabhjot Singh, Union City, CA (US); Shivam Nayan Patel, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 371 days.

(21) Appl. No.: 16/776,424

(22) Filed: Jan. 29, 2020

(65) Prior Publication Data

US 2021/0234669 A1 Jul. 29, 2021

(51) Int. Cl.
*G06F 16/23* (2019.01)
*H04L 9/06* (2006.01)
*G06F 12/0871* (2016.01)

(52) U.S. Cl.
CPC ........ *H04L 9/0637* (2013.01); *G06F 12/0871* (2013.01); *G06F 16/2386* (2019.01); *H04L 9/0643* (2013.01); *H04L 2209/38* (2013.01)

(58) Field of Classification Search
CPC .............................. H04L 67/14; G06F 16/2386
See application file for complete search history.

(56) References Cited

U.S. PATENT DOCUMENTS

| | | | |
|---|---|---|---|
| 7,730,478 B2 | 6/2010 | Weissman | |
| 10,616,230 B2 | 4/2020 | Singh | |
| 10,616,352 B2 | 4/2020 | Elangovan | |
| 10,971,159 B2 | 4/2021 | Singh | |
| 2017/0228391 A1 | 8/2017 | Savla | |
| 2019/0155938 A1 | 5/2019 | Kudriavtsev | |
| 2020/0053089 A1 | 2/2020 | Singh | |
| 2020/0153626 A1* | 5/2020 | Guan | H04L 9/0891 |
| 2020/0160326 A1* | 5/2020 | Sarin | G06Q 20/389 |
| 2020/0356980 A1 | 11/2020 | Singh et al. | |
| 2020/0356998 A1 | 11/2020 | Singh et al. | |
| 2021/0036862 A1 | 2/2021 | Kannan et al. | |
| 2021/0103581 A1* | 4/2021 | Lee | G06F 16/2379 |

* cited by examiner

*Primary Examiner* — Olugbenga O Idowu
(74) *Attorney, Agent, or Firm* — Nicholson, De Vos, Webster & Elliott, LLP

(57) ABSTRACT

Methods and systems are described for using cache objects to store events for adding corresponding objects in a blockchain. In one implementation, a first cache object is identified. The cache object stores events published responsive to updates, insertions, or deletions of records in a database object. An identifier for the cache object is based on a time window with which the cache object is associated, and an identifier for the database object. Events are retrieved from a cache that includes the cache object, based on the identifier for the cache object. The events were stored in the cache object during the time window. A block is added to a blockchain. The block's payload includes objects corresponding to a subset of the events.

20 Claims, 13 Drawing Sheets

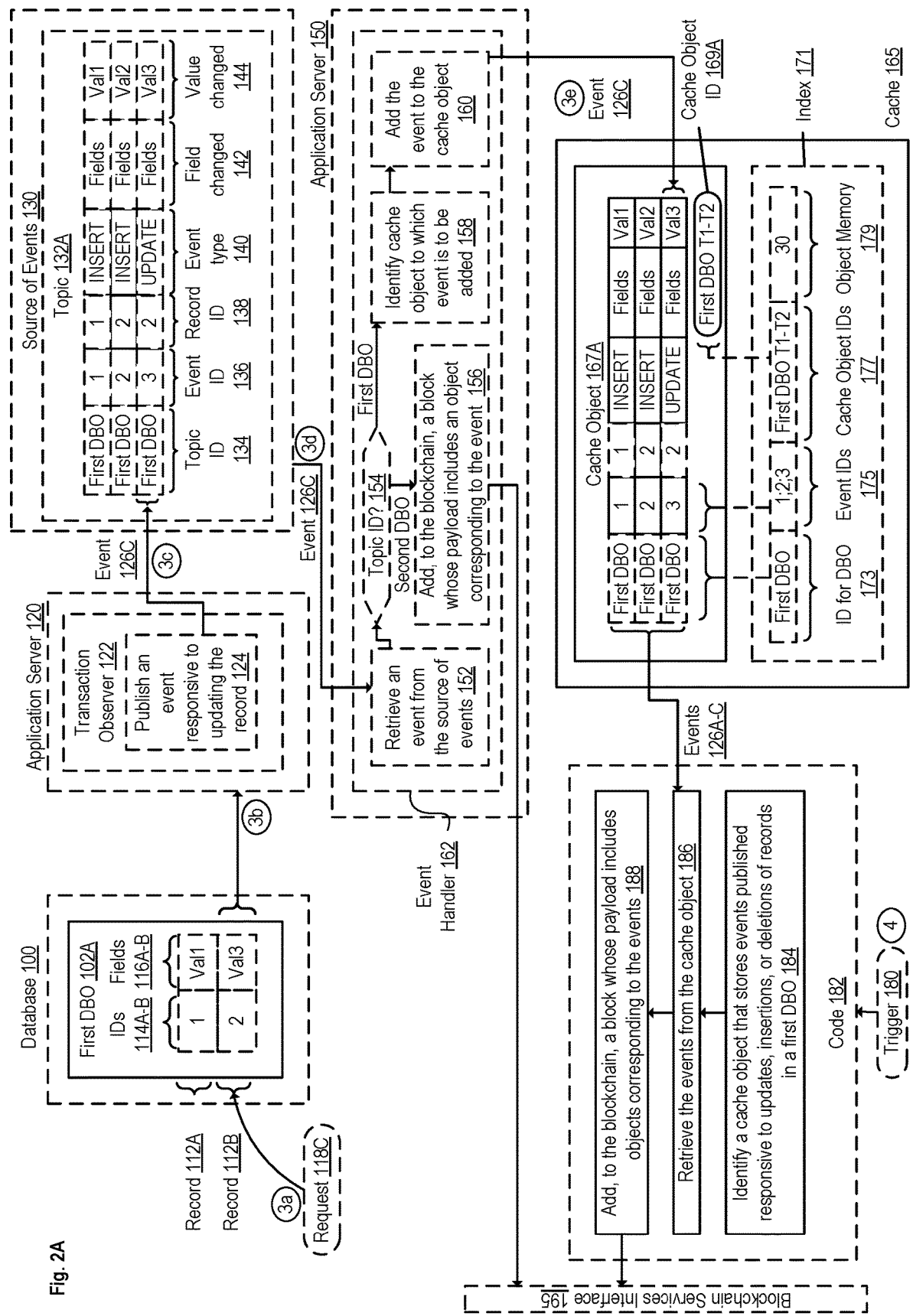

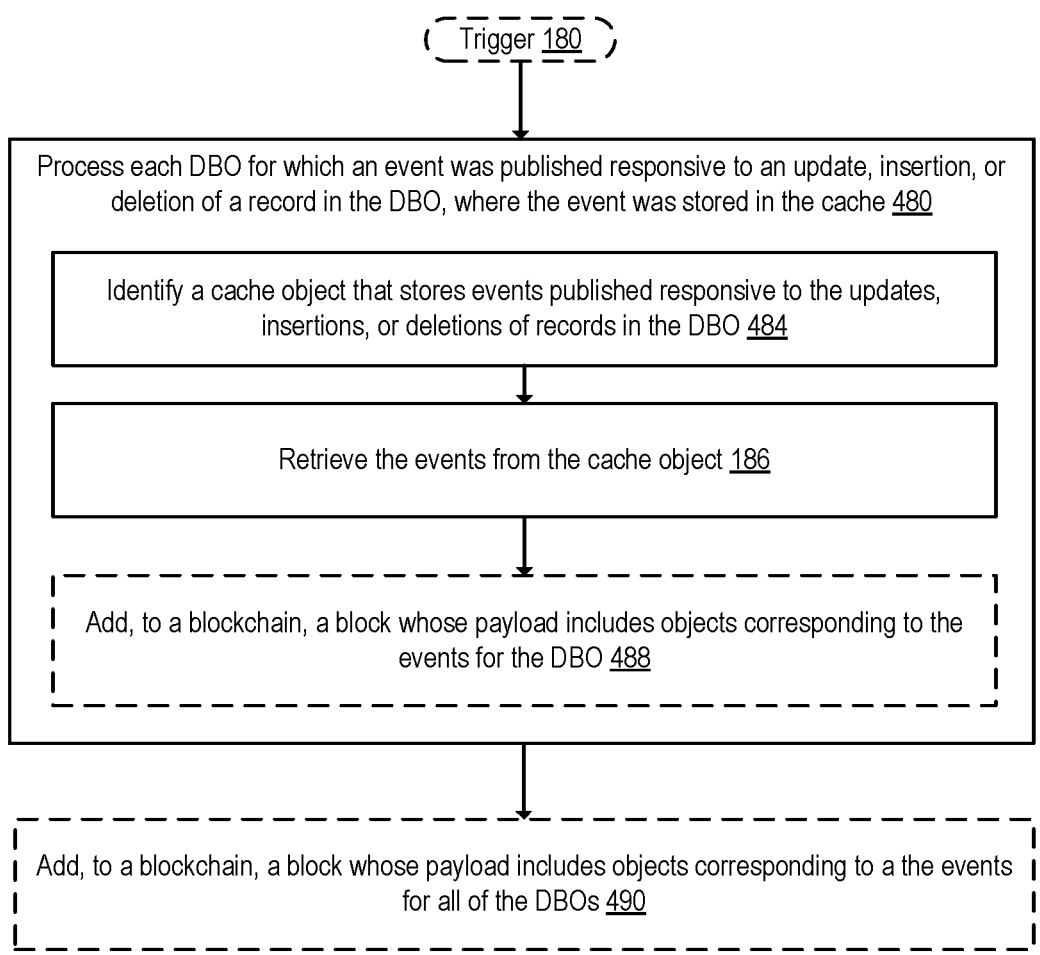

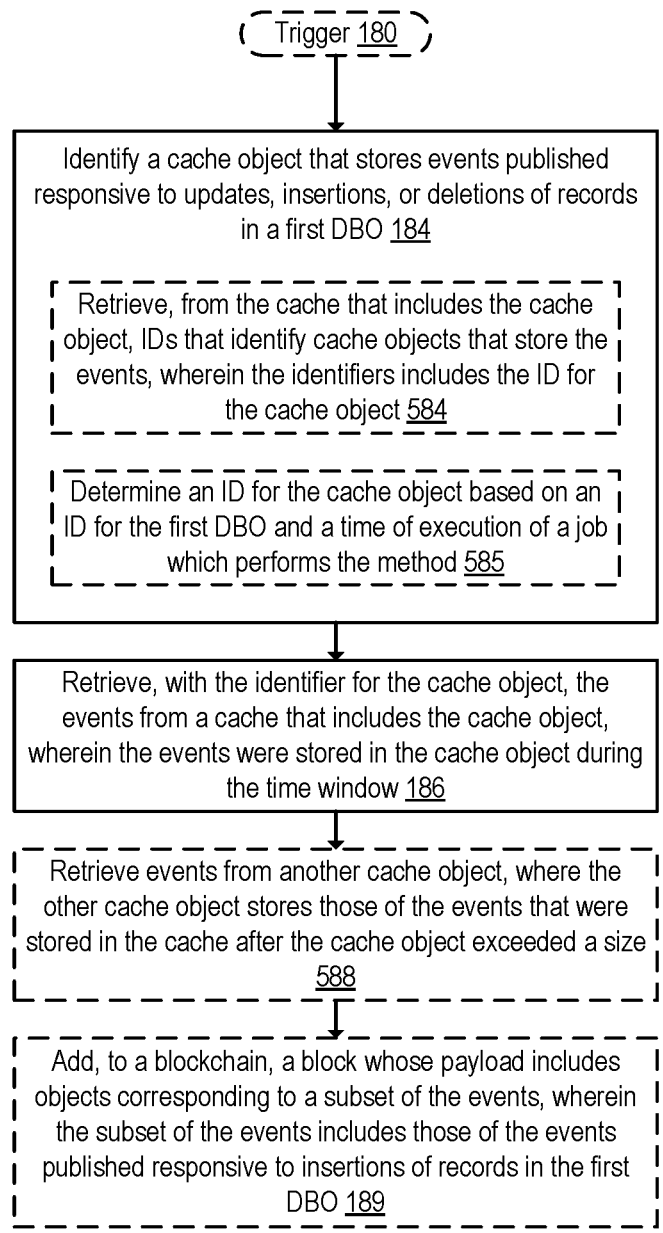

USING CACHE OBJECTS TO STORE EVENTS FOR ADDING CORRESPONDING OBJECTS IN A BLOCKCHAIN

TECHNICAL FIELD

One or more implementations relate to the field of storing data in a blockchain; and more specifically, to using a cache to store events for adding objects in a blockchain.

BACKGROUND ART

A blockchain is a continuously expanding list of records/blocks that are linked and secured using cryptography. A block is a unit of data in a blockchain. A block may include a cryptographic hash of the preceding block in the blockchain, a timestamp, and a payload (i.e., data included in a block that is not functionally related to the block or the blockchain). A blockchain may be shared and managed through a peer-to-peer network via a system of verifying/validating new blocks to be added to the chain such that a block in a blockchain cannot be altered without alteration of all subsequent blocks, which requires network consensus.

Blockchains can be used to store many different types of data. Storing data in a blockchain includes adding a block to the blockchain. Adding a block may involve encrypting the block, communicating amongst nodes in the peer-to-peer network, obtaining consensus amongst nodes to add the block to the blockchain, etc. Adding a block thus incurs overhead in terms of the time needed to add the block, as well as in processor cycles, network communications, use of storage media, etc.

An entity might store, in a database, data that the entity wishes to be stored in a blockchain. A database might comprise one or more database objects (DBOs) that are managed by a database management system (DBMS), each DBO may include a set of records, each record may comprise a set of fields, and each field stores one or more values (also referred to as data). A record may take different forms based on the database model being used and/or the specific DBO to which the record belongs; e.g., a record may be: 1) a row in a table of a relational database; 2) a JavaScript Object Notation object; 3) an eXtensible Markup Language document; 4) a key-value pair; etc.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 2A is a block diagram that shows a system for using a cache to store events, published responsive to insertions or updates of records in a database, for adding corresponding objects in a blockchain, according to some implementations.

FIG. 4B is a flow diagram that shows operations for retrieving events from a cache and adding, in a blockchain, objects corresponding to the events published responsive to insertions, updates, or deletions of records in multiple database objects in the database, according to some implementations.

FIG. 5B is a flow diagram that shows operations for retrieving events from multiple cache objects in a cache and adding, in a blockchain, objects corresponding to the events published responsive to insertions of records in the database, according to some implementations.

DETAILED DESCRIPTION

The following description describes implementations for using a cache to store events, published responsive to updates, insertions, and/or deletions of records in a database, for adding corresponding objects in a blockchain.

Some implementations may publish an event responsive to updating, inserting, or deleting a record in a database object (DBO). An event is any identifiable unit of data that conveys information about an occurrence, operation, or entity in a computing system. For example, an event may convey that a record of a database has been updated, deleted, or inserted. Typically, an event includes one or more attributes. An attribute (also referred to as a field) of an event is a part of an event that may contain one or more values. In one implementation, an attribute comprises an identifier and one or more values associated with that identifier. The attributes included in an event can be referred to as a payload. An event's attributes may or may not include an identifier for a topic (also referred to as a topic ID). An identifier (ID) is information to identify one or more objects; e.g., a cache object, a database object, a record in a database object, etc. A topic is a common characteristic or identifier of events of a particular type. Publishing an event means making the event available in a source of events, which is a source of data from which an event can be read (e.g., a datastore, a database, a message bus, an event bus, a stream, a cache, etc.).

While implementations may use one or more types of databases, a relational database with tables is sometimes described to simplify understanding. In a relational database management system (RDBMS), each relational database table (which is a type of DBO) generally contains one or more data categories logically arranged as columns according to a schema, where the columns of the relational database table are different ones of the fields from the plurality of records (i.e., where the different ones of the fields each store data of the same type, and are each associated with the same name for the field), and where rows of the relational database table are different ones of a plurality of records and each contains an instance of data for each category defined by the fields. Thus, the fields of a record are defined by the structure of the DBO to which the field belongs.

Figure 1A:
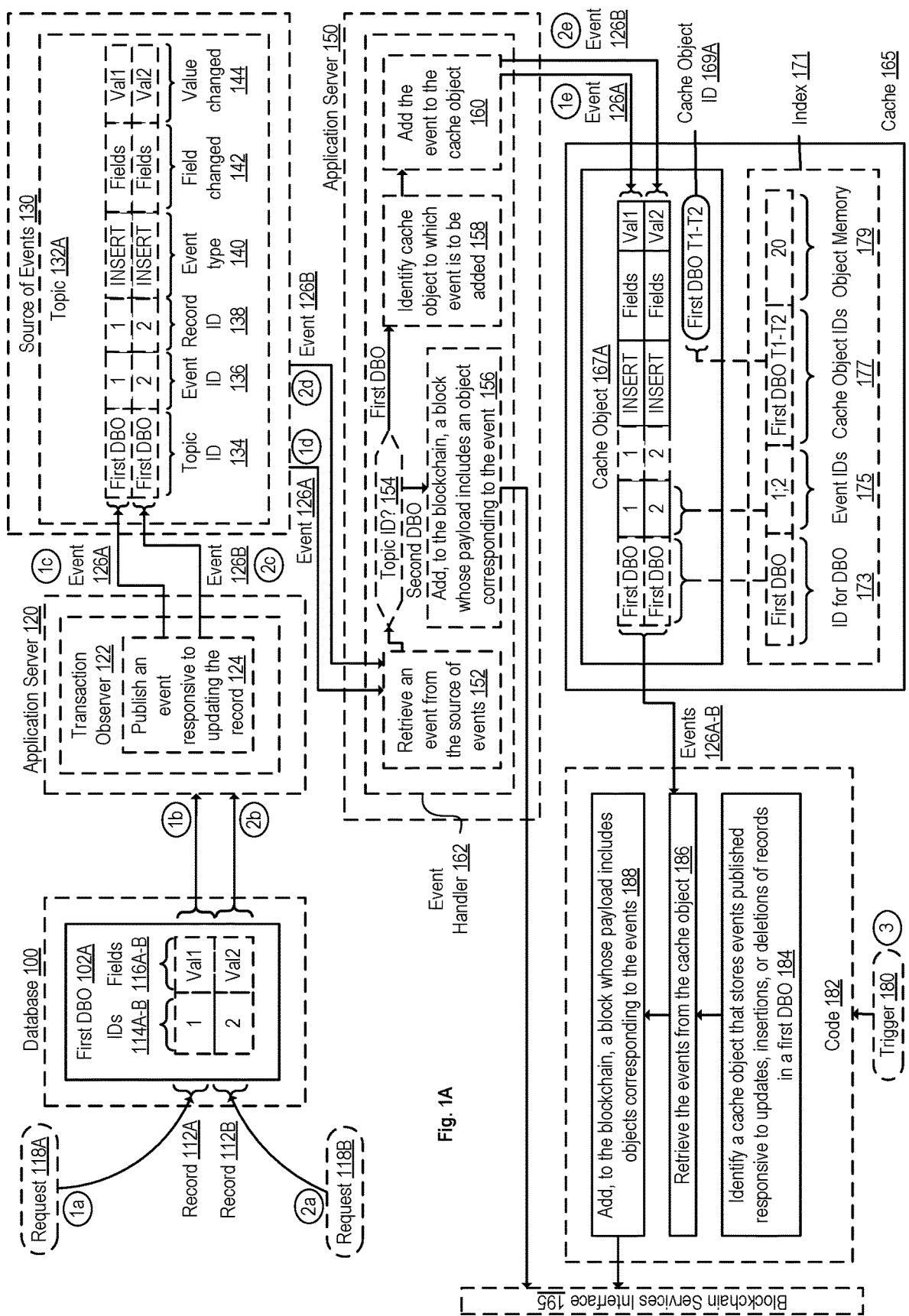
FIG. 1A is a block diagram that shows a system for using a cache to store events, published responsive to insertions of records in a database, for adding corresponding objects in a blockchain, according to some implementations.

FIG. 1A shows a database 100, application server 120, source of events 130, application server 150, cache 165, code 182, and blockchain services interface 195.

Publishing Events Responsive to a Database Change

At time 1a (indicated by circled reference "1a"), request 118A is submitted to database 100. Database 100 includes first DBO 102A. First DBO 102A includes IDs 114A-B (corresponding to ID 114A of record 112A and ID 114B of record 112B) and fields 116A-B (corresponding to field 116A of record 112A and field 116B of record 112B). Responsive to database 100 receiving request 118A, record 112A is inserted in first DBO 102A. Record 112A includes a value of "1" for ID 114A and a value of "Val1" for field 116A. In contrast, at time 2a (indicated by circled reference "2a"), request 118B is submitted to database 100. Responsive to database 100 receiving request 118B, record 112B is inserted in first DBO 102A. Record 112B includes a value of "2" for ID 114B and a value of "Val2" for field 116B.

At time 1b and time 2b respectively, the insertion of record 112A and the insertion of record 112B is indicated to application server 120. Indicating an insertion, update, or deletion of a record 112 to application server 120 is performed in different ways in different implementations. In one implementation, database 100 is configured to indicate the change to application server 120. Database 100 may indicate the change via a push mechanism. For example, database 100 may include a database trigger that is executed responsive to updating, inserting, or deleting a record 112 in first DBO 102A, and executing the database trigger causes code in application server 120 to be called or executed. In another implementation, the change in database 100 may be indicated to application server 120 via a pull mechanism. For example, application server 120 may monitor database 100 such that application server 120 detects when a record 112 in first DBO 102A is updated, inserted, or deleted. In one implementation, application server 120 may include transaction observer 122 that is called responsive to a change in state of a transaction (e.g., the transaction being committed), where the transaction includes updating, inserting, or deleting a record 112 in first DBO 102A.

At time 1c, block 124 is performed. Block 124 includes publishing an event 126 responsive to updating, inserting, or deleting a record 112. Specifically, at time 1c, event 126A is published to source of events 130 responsive to the insertion of record 112A. At time 2c, event 126B is published to source of events 130 responsive to the insertion of record 112B.

As shown in source of events 130, event 126A and event 126B are associated with topic 132A. An event 126 can be associated with a topic 132 in different ways. In one implementation, an event 126 can be associated with a topic 132 in part by including a topic ID 134 in the event 126. The topic ID 134 may be included in the payload and/or in a header of the event 126. In another implementation, an event 126 can be associated with a topic 132 without including a topic ID 134 in the event. For example, an event 126 may be published by calling an application programming interface (API) endpoint with the event 126 (or data comprising the event) and an identifier for the topic with which the event 126 is to be associated.

In some implementations, the topic 132 with which an event 126 is associated is identified by an identifier for the DBO 102 in which the record 112 was updated, deleted, or inserted. For example, topic ID 134A of event 126A has the value "First DBO"; this topic ID corresponds to an identifier (e.g., a name) of first DBO 102A in some implementations. In such implementations, including an identifier for the DBO 102 in which the record 112 was updated, deleted, or inserted may be unnecessary (e.g., because that identifier is reflected in the topic ID 134). Other implementations use different approaches for identifying the topic 132 with which an event 126 is associated. For example, an event 126 might be associated with an identifier for database 100, or with an identifier that describes the DBO 102 in which the record 112 was updated, deleted, or inserted, etc.

As shown in FIG. 1A, an event 126 may include various attributes: topic ID 134 (to store a topic ID with which event 126 is associated); event ID 136 (to store an ID for a given event 126); record ID 138 (to store an ID for the record 112 to which the event 126 relates); event type 140 (to store whether the record 112 to which the event 126 relates was updated, deleted, inserted, etc.); field changed 142 (to store IDs for one or more fields that were changed in record 112); and value changed 144 (to store values for the one or more fields).

Implementations may treat one or more of these attributes as optional, and/or include other attributes not shown in FIG. 1A. For example, an implementation might omit record ID 138 from an event 126. An implementation might include other or omit attributes for certain topics 132 and not for others, or for certain event types 140 and not for others. For example, an implementation might omit the attribute field changed 142 and the attribute value changed 144 in an event 126 which has a value of "DELETE" for event type 140 (e.g., because the record 112 has been deleted). Another implementation might include an attribute for each field of record 112 that stores a value that was changed (e.g., updated or inserted) and an attribute for each such value that was changed. Other attributes might be included; e.g., one or more of 1) a timestamp corresponding to when the record was updated, inserted, or deleted; 2) a timestamp corresponding to when the transaction that included the update, deletion, or insertion was started; 3) a timestamp corresponding to when that transaction was committed; etc.

Event 126A includes the following attributes and corresponding values: 1) a value of "First DBO" for topic ID 134 (corresponding to an ID for first DBO 102A in which record 112A was inserted); 2) a value of "1" for event ID 136; 3) a value of "1" for record ID 138 (corresponding to the value "1" for ID 114A of record 112A); 4) a value of "INSERT" for event type 140 (indicating that record 112A was inserted in first DBO 102A); 5) a value of "Fields" for field changed 142; and 6) a value of "Val1" for value changed 144 (corresponding to the value "Val1" of field 116A of record 112A).

Event 126B includes the following attributes and values: 1) a value of "First DBO" for topic ID 134 (corresponding to an ID for first DBO 102A in which record 112A was inserted); 2) a value of "2" for event ID 136; 3) a value of "2" for record ID 138 (corresponding to the value "2" for ID 114B of record 112B); 4) a value of "INSERT" for event type 140 (indicating that record 112B was inserted in first DBO 102A); 5) a value of "Fields" for field changed 142; and 6) a value of "Val2" for value changed 144 (corresponding to the value "Val2" of field 116B of record 112B).

Retrieving Events from the Source of Events

When an event 126 has been published to the source of events 130, the event 126 can be read from the source of events 130. FIG. 1A shows application server 150 which includes event handler 162. In one implementation, event handler 162 includes blocks 152, 154, 156, 158, and 160.

In block 152, an event 126 published responsive to an update, insertion, or deletion in a DBO 102 is retrieved from the source of events 130. In the example shown in FIG. 1A, at time 1d and time 2d, event 126A and event 126B are respectively retrieved from the source of events 130.

In implementations based on a publish-subscribe messaging system, event handler 162 subscribes to a topic 132 to receive events 126 published to the source of events 130 that are associated with that topic 132. For example, in such implementations, event handler 162 may subscribe to topic 132A to receive events 126 associated with topic 132A (e.g., events 126 published responsive to updates, insertions, or deletions of records 112 in a DBO 102). In some implementations, event handler 162 is notified when an event 126 that is associated with one of these topics 132 (to which the event handler has subscribed) is published to the source of events 130, and event handler 162 can then retrieve the event 126. In other implementations, an event 126 is pushed to event handler 162; e.g., by calling block 152. Additionally or alternatively, event handler 162 can poll the first source of events 130 (e.g., at predefined intervals) to determine whether an event 126 has been published. These techniques are exemplary and not limiting. For example, implementations may be based on message queueing, and thus publishing an event 126 might include publishing the event 126 to a message queue read by event handler 162. Alternatively, an event 126 may be broadcast to a channel and read by event handler 162 connected to the channel. Rather than use a source of events 130 that supports multiple topics 132 (e.g., topic 132A, topic 132B, etc.), some implementations may use a different configuration; e.g., a source of events 130 per topic 132.

From block 152, flow passes to block 154. Block 154 includes determining whether the event 126 includes a given topic ID 134. For example, some implementations can be configured such that 1) topic ID 134 of an event 126 indicates the DBO 102 in which record 112 was updated, inserted, or deleted; and 2) based on that topic ID 134, the event 126 is stored in cache 165 or added to a blockchain (e.g., blockchain 699 shown in FIG. 6B) without being stored in cache 165, such as via a blockchain services interface 195. Allowing for this kind of configuration allows flexibility in the application infrastructure. For example, if updates, insertions, or deletions of records 112 in a DBO 102 are relatively frequent, events 126 published responsive to such updates, insertions, or deletions can be cached in cache 165 via block 160 (thus providing advantages as described later herein); whereas events 126 published responsive to relatively less frequent updates, insertions, deletions in another DBO 102 can be added to the blockchain, via block 156, without use of the cache 165 (thus reducing delay, improving freshness of data stored in the blockchain, etc.).

In block 154, responsive to determining that a topic ID 134 of an event 126 indicates that the event 126 relates to an update, insertion, or deletion of a record 112 in a given DBO 102 (e.g., first DBO 102A), flow passes from block 154 to block 158. In contrast, flow passes from block 154 to block 156 responsive to determining that a topic ID 134 indicates that the event 126 relates to an update, insertion, or deletion of a record 112 in another DBO 102 (e.g., "Second DBO," as shown), flow passes from block 154 to block 158.

In block 156, a block whose payload includes an object corresponding to the event 126 is added to the blockchain via blockchain services interface 195. Operations for adding a block to a blockchain are described in more detail later herein.

Cache Objects

In block 158, a cache object 167 to which event 126 is to be added is identified. FIG. 1A shows a cache 165. Cache 165 includes a cache object 167A. A cache 165 is a software or hardware component for storing data temporarily. Examples of caches include a key-value store (e.g., memcached, Redis, Hazelcast), a rowstore (e.g., MemSQL), etc. In some implementations, cache 165 is a distributed cache; i.e., a cache 165 hosted on multiple electronic devices and shared by multiple application servers 150 and/or multiple instances of code 182. A cache object 167 is an identifiable portion of a cache 165 in which data can be stored separately from data stored in other portions of the cache 165. A cache object 167 might include an ID (e.g., cache object ID 169A with a value of "First DBO T1-T2") to identify the cache object 167 compared to other cache objects 167.

A cache 165 for storing events 126 responsive to updates, insertions, or deletions of records 112 in a DBO 102 can be structured in different ways which reflect event characteristics. An event 126 has different characteristics, including: 1) a DBO 102 to which the event 126 relates (which may be indicated in topic ID 134); 2) an operation (e.g., update, insert, delete) to which the event 126 relates (which may be indicated in event type 140); 3) a record 112 to which the event 126 relates (which may be indicated in record ID 138); etc. Moreover, characteristics of an event 126 may include characteristics relating to time: 1) a time corresponding to when the event 126 was published; 2) a time corresponding to when the event 126 was retrieved from the source of events 130 (e.g., in block 152); 3) a time at which the event 126 is to be added to the cache object 167 (e.g., in block 160); 4) a time at which the record 112 was updated, deleted, or inserted; etc.

Cache 165 can be structured to reflect one or more of these characteristics. In one implementation, cache 165 is structured such that it includes a cache object 167 corresponding to each of the DBOs 102 for which events 126 are to be stored in cache 165. Additionally or alternatively, cache 165 can be structured such that it includes a cache object 167 associated with a given time window (i.e., a period of time that is defined by 1) a start time and end time; or 2) a start time or end time, and a duration). For example, in one implementation, cache 165 could be structured such that it includes a cache object 167 associated with a time window relative to a system time (e.g., the current minute value of a system clock), where the cache object 167 is to store events 126 retrieved from source of events 130 during that time window (e.g., the current minute value of a system clock).

As shown in FIG. 1A, cache object 167A includes cache object ID 169A with a value of "First DBO T1-T2." This value is based on an identifier for first DBO 102A (i.e., "First DBO") and a time window with which the cache object 167A is associated (i.e., "T1-T2"). For purposes of illustration, the time window might correspond to a time in seconds, a time in minutes, a time in hours, etc., at which the first cache object was created.

Figure 1B:
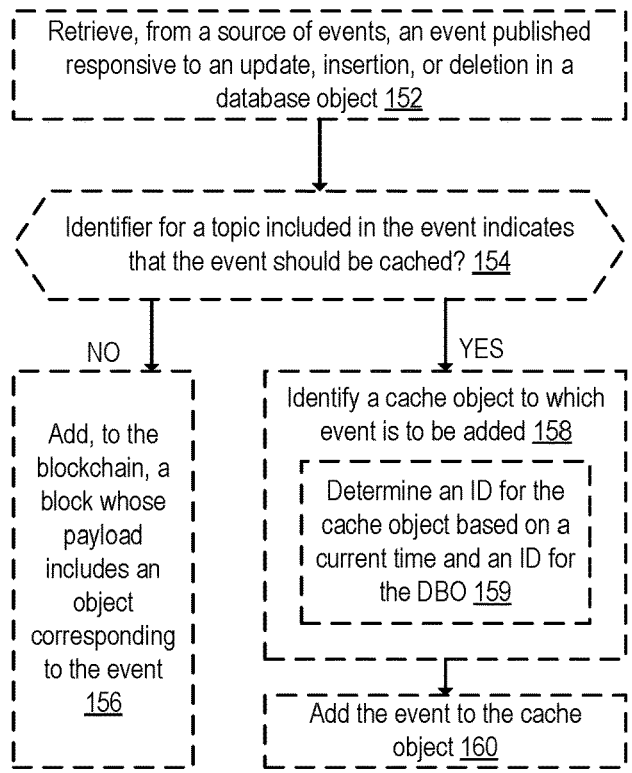
FIG. 1B is a flow diagram that shows operations for adding, to a cache, events published responsive to updates, insertions, or deletions of records in a database object, according to some implementations.

Referring to FIG. 1B, block 158 includes block 159 in one implementation. In block 159, an ID 169 for a cache object 167 is determined based on a current time and an ID for a DBO 102. Where a cache 165 is structured to include a cache object 167 associated with one-minute time intervals on a system clock, determining the ID 169 for a cache object 167 is based on the current system time in minutes. For example, for a system time of 9:29 am, determining the ID 169 may be based on the value of "29." Where a cache 165 is structured to include a cache object 167 associated with five-minute time intervals on a system block starting on the hour, determining the ID 169 for a cache object 167 is based on the current system time in minutes, rounded to a multiple of five minutes. Continuing the previous example, determining the ID 169 may be based on a value of "25" (i.e., the minute value of "29" rounded down) or a value of "30" (i.e., the minute value rounded up).

In some implementations, block 158 may include creating a cache object 167 as necessary. For example, where cache objects 167 are associated with a time window, the first execution of block 158 during the time window can create the cache object 167 for that time window. In contrast, where cache objects 167 are associated with a DBO 102, the first execution of block 158 for an event 126 published responsive to an update, insertion, or deletion in that DBO 102 can create the cache object 167. In some implementations, creating a cache object 167 occurs by attempting to add an event 126 to a cache object that does not exist in cache 165.

From block 158, flow passes to block 160. In block 160, the event 126 is added to the cache object 167. In one implementation, adding event 126 to cache object 167 is performed with an ID 169 for the cache object 167. In the example shown in FIG. 1A, at times 1e and 2e, event 126A and event 126B are respectively added to cache object 167A.

In one implementation, more than one event 126 is processed simultaneously by event handler 162. In such an implementation, block 152 includes retrieving multiple events 126 from the source of events 130; e.g., all events 126 associated with a topic ID 134, such as topic ID 134A. Where all events 126 that are retrieved are associated with the same topic ID 134, the determination made in block 154 may apply to each of the events 126 that are retrieved. Thus, in block 156 or in each of block 158 and block 160, the events 126 can be processed in bulk as well. Processing the events 126 in this fashion may offer performance benefits (e.g., by adding events 126 to cache 165 in block 160 in bulk; by adding objects corresponding to events 126 to the blockchain in block 156 in one block; by reducing overhead in calling one or more functions that implement block 152, block 154, block 156, block 158, block 160; etc.).

In some implementations, cache 165 includes an index 171. An index 171 can be useful for tracking the cache objects 167 in a cache 165 and the events 126 stored therein. In one implementation, index 171 includes an entry comprising one or more of the following for each cache object 167: 1) ID for DBO 173; 2) event IDs 175; 3) cache object IDs 177; and 4) object memory 179. ID for DBO 173 stores an ID for a DBO 102 (e.g., "First DBO" as shown). Event IDs 175 stores a set of IDs for events that are stored in cache 165 that were published responsive to an update, insertion, or deletion on the DBO identified by ID for DBO 173 (e.g., event IDs with values of "1" and "2" as shown, corresponding to event IDs 136 of event 126A and event 126B). Cache object IDs 177 stores the IDs for the cache objects 167 which store the events 126 with the IDs stored in event IDs 175 (e.g., cache object ID 169A with a value of "First DBO T1-T2" as shown). Object memory 179 stores a current size of the cache object(s) 167 associated with the cache object IDs 177 (e.g., a value of "20" for the cache object 167A associated with the ID "First DBO T1-T2").

Using an index 171 facilitates retrieving events 126 from cache 165. In implementations where index 171 includes ID for DBO 173, a component can retrieve events 126 from cache 165 according to the DBO 102 to which events 126 relate, by retrieving the cache object IDs 177 associated with an ID for DBO 173. In implementations where index 171 includes event IDs 175, a component can retrieve events 126 from cache 165 by event ID 136 corresponding to the event IDs 175, regardless of the structure of the cache 165. For example, the component can retrieve events 126 from cache 165 by event ID 136 event if cache 165 stores all events 126 in one cache object 167. In implementations where index 171 includes cache object IDs 177, a component can identify the cache object 167 with an ID in cache object IDs 177 that stores events 126 published responsive to updates, insertions, or deletions in a DBO 102 with ID for DBO 173. Object memory 179 can store a measure of size of a cache object 167. The size of a cache object 167 means a measure of the data stored in the cache object 167. For example, the size of a cache object 167 might be the memory footprint of the cache object 167, the number of events 126 stored in the cache object 167, etc. Storing the size of a cache object 167 can be useful for debugging purposes, cache optimization, etc.

Retrieving Events from the Cache

At time 3, a trigger 180 causes code 182 to be executed. Different implementations can use different triggers 180. In one implementation, trigger 180 is execution of a job. A job is a computing task that is scheduled to be executed on an electronic device at a given time; e.g., a job created with the utility named "CRON" on Unix-like operating systems; a task created with Windows Task Scheduler on the Windows operating system; a task created with a grid broker; etc. Execution of a job is execution, by an electronic device, of instructions that comprise the job.

In some implementations, code 182 is executed as part of a job that is executed at a frequency which matches a duration of the time window with which one or more cache objects 167 are associated. For example, where one or more cache objects 167 are associated with a time window of one minute's duration, execution of the job may occur at one-minute intervals (and may include executing code 182 with respect to one cache object 167). Alternatively, the frequency of the job's execution may match a duration of the time window because the frequency of the job's execution is a multiple of the time window's duration. For example, where one or more cache objects 167 are associated with a time window of one minute's duration, execution of the job may occur at five-minute intervals (and may include executing code 182 with respect to five cache objects 167).

Executing code 182 (and thus retrieving events 126 in block 186) as part of execution of a job executed at a frequency which matches a duration of the time window also allows some guarantees of freshness of the data stored in the blockchain. For example, if a job is executed every minute, the data stored in the blockchain will be current to within two minutes (subject to the time to execute code 182) compared to the data stored in DBO 102 (if cache objects 167 are associated with a time window of one minute). If the job is executed at a time corresponding to the end of the then-current time window (e.g., the one-minute interval), the data stored in the blockchain will be current to within one minute (subject to the time to execute code 182).

In another implementation, trigger 180 is a callback executed by cache 165; e.g., responsive to one or more cache objects 167 exceeding a given size. Other implementations may include other triggers 180. In one implementation, code 182 or another component might poll cache 165 and trigger 180 represents an indication that events 126 are to be retrieved from cache 165. For example, trigger 180 might represent code 182 or another component determining that cache 165, or one or more cache objects 167 therein, have reached a predefined size (e.g., 1 Mb). In another implementation, trigger 180 is a thread or process being woken, where code 182 is to be executed by that thread or process. In one implementation, the thread or process is woken at a frequency which matches the duration of the time window.

Responsive to trigger 180, block 184 is performed. In block 184, a cache object 167 is identified that stores events 126 published responsive to updates, insertions, or deletions of records 112 in a first DBO 102A.

Identifying the cache object 167 can occur in different ways. When a cache 165 is structured such that it includes cache objects 167 associated with time windows, identifying the cache object 167 may be based on a time window. For example, in some implementations, trigger 180 is execution of a job, where the job is executed at a frequency which matches a duration of the time window. Thus, the time window can be identified based on a time of the execution of the job (e.g., because the job execution is triggered at the end of the time window to which the job corresponds). In other implementations, trigger 180 is a thread or process being woken, where the thread or process is woken at a frequency which matches a duration of the time window. Thus, the time window can be identified based on a time that the thread or process is woken (e.g., by identifying a system time when the thread or process is woken).

In implementations where a cache 165 is structured such that it includes cache objects 167 associated with identifiers for DBOs 102, identifying a cache object 167 may be based on identifying such DBOs 102. This can be performed statically; e.g., by reading identifiers for such DBOs 102 from a configuration file. Alternatively, identifying DBOs 102 can be performed dynamically by querying a database 100 or the cache 165 itself. An example of the latter approach is querying index 171 in implementations where cache 165 includes an index 171, and, retrieving cache object IDs 177 for entries in index 171 that are each associated with an ID for DBO 173.

As discussed previously, implementations may support a cache 165 structured such that it includes cache objects 167 associated with a time window and an ID for a DBO 102. In such implementations, identifying a cache object 167 from which to retrieve events 126 may involve an ID 169 for the cache object 167, where the identifier is based on a time window with which the cache object 167 is associated and an identifier for the first DBO 102A.

Figure 1C:
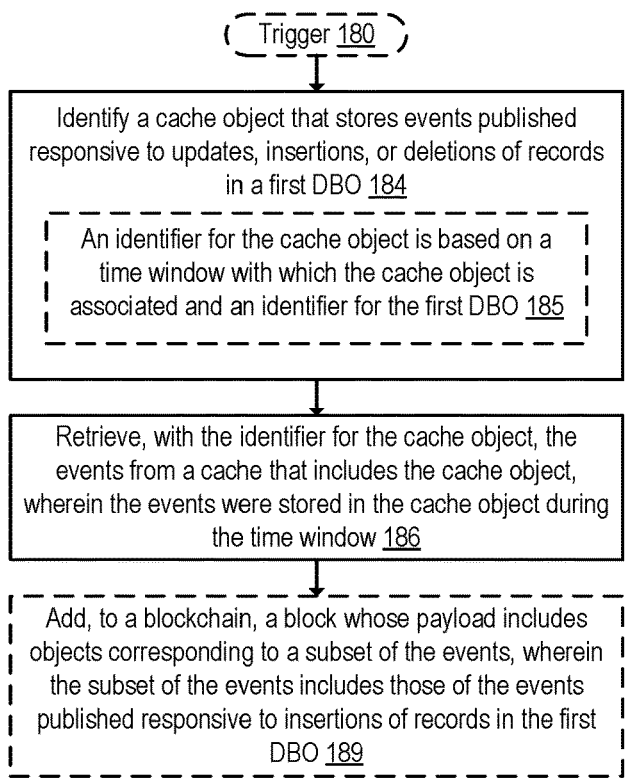
FIG. 1C is a flow diagram that shows operations for retrieving events from a cache and adding, in a blockchain, objects corresponding to the events published responsive to insertions of records in the database, according to some implementations.

An exemplary implementation is shown in FIG. 1C. FIG. 1C is a flow diagram that shows operations for retrieving events from a cache and adding, in a blockchain, objects corresponding to the events published responsive to insertions of records in the database, according to some implementations. In block 185, an ID 169 for a cache object 167 is based on a time window with which the cache object 167 is associated and an identifier for the first DBO 102. Referring back to FIG. 1A, the ID 169 is based on the time window with an identifier of "T1-T2" and the identifier "First DBO" for first DBO 102A. Regardless of the way that an implementation identifies cache object(s) 167, an implementation might call a service external to code 182 to perform the identification, where the service provides a set of identifiers that identify cache objects 167. Referring back to FIG. 1A, flow passes from block 184 to block 186.

In block 186, events 126 are retrieved from the cache object 167.

In one implementation shown in FIG. 1C, retrieving events 126 from the cache object 167 is performed with the ID 169 for the cache object 167, where the events 126 were stored in the cache object 167 during the time window. In the example shown in FIG. 1A, event 126A and event 126B were stored in cache object 167A during the time window identified with the value "T1-T2." In this example, block 186 includes retrieving event 126A and event 126B with the ID 169 with the value of "First DBO T1-T2" from cache 165 as indicated by the arrow from events 126A-B and block 186. From block 186, flow passes to block 188.

Adding Objects to the Blockchain

In block 188, a block (e.g., block 642 shown in FIG. 6B) is added to a blockchain (e.g., blockchain 699 shown in FIG. 6B) where the block's payload includes objects corresponding to the events 126 retrieved from the cache object 167. The block may be added to the blockchain via blockchain services interface 195. An object corresponding to an event 126 is a set of values for the state of the record 112 that was updated, inserted, or deleted, responsive to which the event 126 was published. For example, a record 112 could represent an electronic record of an item of inventory, and first DBO 102A could represent an inventory list for those items. A record 112 might be inserted, updated, or deleted to reflect an item being added to, revised in, or removed from, the inventory. An event 126 might be published responsive to the update, insertion, or deletion of record 112. An object corresponding to the event 126 represents the state of the item of inventory (e.g., as added to, revised, or removed from the inventory). Thus, adding the object to the blockchain allows the blockchain to reflect the update, insertion, or deletion of record 112. In the example shown in FIG. 1A, block 188 includes adding to a blockchain a block whose payload (also referred to as a block payload) includes objects corresponding to event 126A and event 126B (i.e., to the insertion of record 112A and record 112B to first DBO 102A).

Adding, to a blockchain, a block whose payload includes multiple objects corresponding to multiple events 126 provides performance benefits relative to adding multiple blocks, where the payload of each block includes a respective object corresponding to one of the events 126. As mentioned previously, adding a block to a blockchain involve several operations (e.g., encrypting the block, communicating amongst nodes in the peer-to-peer network, obtaining consensus amongst nodes, etc.) and thus incurs overhead in terms of the time and computing resources needed to add the block. Adding one block whose payload includes multiple objects thus reduces the overhead compared to adding multiple blocks. In applications where the addition of blocks is relatively frequent, overhead in adding blocks to a blockchain can be a limiting factor in the transactions that can be supported on the blockchain. By adding a block corresponding to multiple objects, this limitation can be mitigated. For example, in implementations where events 126 are cached in cache objects 167 associated with one-minute intervals, the number of blocks added to a blockchain in a day can be reduced by a factor of 1440. If fifty million records 112 are inserted in a DBO 102 in a day, the number of blocks added to the blockchain can thus be reduced from fifty million blocks to around thirty-five thousand blocks.

Moreover, adding a block whose payload corresponds to the events 126, rather than corresponding to the records 112, avoids the need for retrieving data from the records 112 from database 100 when adding the block to the blockchain. In turn, this avoids the overhead of submitting a request to database 100, database 100 processing the request, and database 100 returning a result responsive to the request.

Referring again to FIG. 1C, some implementations include block 189 in addition or as an alternative to block 188. In block 189, a block is added to a blockchain, where the block's payload includes objects corresponding to those of the events 126 published responsive to insertions of records 112 in the first DBO 102A. Adding those of the events 126 published responsive to insertions of records 112 in the first DBO 102A might be desirable in some implementations; e.g., where events 126 are published responsive to insertions, but not responsive to updates or deletions, of records 112. Implementations might favor publishing events 126 responsive only to insertions of records 112 when insertions of records 112 are relatively higher frequency than updates or deletions of records 112.

Removing Events from the Cache

Some implementations include removing events 126 from cache 165 after objects corresponding to the events 126 are added to the blockchain. Events 126 can be removed by the cache 165 itself. For example, cache 165 might be configured such that a cache object 167 and its contents are deleted after a period of time elapses. In other implementations, a component such as code 182 might include operations for removing events 126 from the cache 165 after a block whose payload includes objects corresponding to the events 126 has been successfully added to the blockchain in block 188. Other implementations may remove events 126 from cache 165 differently. For example, one implementation might include a separate job which determines, based on the blockchain, whether events 126 are to be removed from the cache 165 and removes events 126 accordingly. In another example, a smart contract might remove one or more events 126 from the cache 165 responsive to objects corresponding to those events 126 being added to the cache 126 (a smart contract is executable code, stored in a blockchain, that is executed automatically responsive to an operation on the blockchain). Removing events 126 from cache 165 prevents corresponding objects being stored more than once in the blockchain, reduces the size of cache 165 and cache objects 167, etc.

It should be noted that, while code 182 is executed and thus events 126 are being retrieved from cache 165, event handler 162 may be adding additional events 126 to the cache 165. An additional advantage of structuring cache 165 to include cache objects 167 associated with a time window is that while events 126 are being retrieved from a cache object 167 associated with one time window (e.g., cache object 167A associated with time window "T1-T2"), events may be added to another cache object 167 associated with another time window (e.g., a cache object 167B associated with time window "T2-T3"). Thus, including separate cache objects 167 associated with the different time windows provides a clean separation, in time, in how the events 126 are stored in cache 165. In turn, this avoids the need for locking a cache object 167 when adding an event 126 to, and/or retrieving an event 126 from the cache object 167.

Events Published Responsive to Updates

FIG. 2A is a block diagram that shows a system for using a cache to store events, published responsive to insertions or updates of records in a database, for adding corresponding objects in a blockchain, according to some implementations. Elements shown in FIG. 2A with reference numbers common to elements shown in FIG. 1A and/or FIG. 1B have been described referring to same.

At time 3a (indicated by circled reference "3a"), request 118C is submitted to database 100. Responsive to database 100 receiving request 118C, record 112B is updated in first DBO 102A. Record 112B (as updated) includes a value of "2" for ID 114B and a value of "Val3" for field 116B.

At time 3b, the update of record 112B is indicated to application server 120. Indicating an update of a record 112 to application server 120 was described referring to FIG. 1A.

At time 3c, block 124 is executed. Block 124 includes publishing event 126C to source of events 130 responsive to updating record 112B. As shown in source of events 130, event 126C is associated with topic 132A. For purposes of illustration, event 126A and event 126B are also shown in source of events 130, and associated with topic 132A.

Event 126C includes the following attributes and corresponding values: 1) a value of "First DBO" for topic ID 134 (corresponding to an ID for first DBO 102A in which record 112B was updated); 2) a value of "3" for event ID 136; 3) a value of "2" for record ID 138 (corresponding to the value "2" for ID 114B of record 112B); 4) a value of "UPDATE" for event type 140 (indicating that record 112B was updated in first DBO 102A); 5) a value of "Fields" for field changed 142; and 6) a value of "Val3" for value changed 144 (corresponding to the value "Val3" of field 116B of record 112B).

At time 3d, event 126C is retrieved from the source of events 130 in block 152. From block 152, flow passes to block 154 which includes determining that event 126C includes a topic ID with a value of "First DBO" (e.g., which indicates that event 126C is to be cached). Accordingly, flow passes from block 154 to block 158, and from block 158 to block 160, which were described referring to FIG. 1A.

At time 3e, event 126C is added to cache object 167A which, for purposes of illustration, also includes event 126A and event 126B (described referring to FIG. 1A). Index 171 also shows an entry with event IDs 175 with a value of "1;2;3" corresponding to the values of event ID 136 for event 126A, event 126B, and event 126C stored in cache object 167A. In one implementation, index 171 is updated to reflect adding an event 126 (e.g., event 126C) by event handler 162. In another implementation, cache 165 updates index 171 automatically responsive to adding an event 126.

At time 4, trigger 180 causes code 182 to be executed. Trigger 180 and code 182 were described referring to FIG. 1A and FIG. 1B. In one implementation, code 182 includes block 189 in addition or as an alternative to block 188.

Figure 2B:
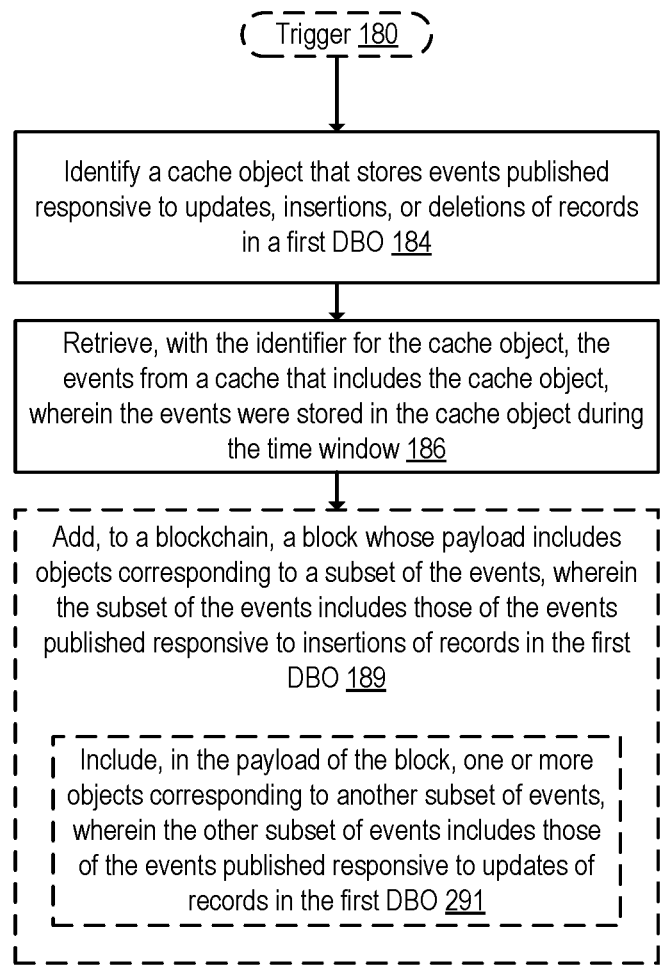
FIG. 2B is a flow diagram that shows operations for retrieving events from a cache and adding, in a blockchain, objects corresponding to the events published responsive to insertions or updates of records in the database, according to some implementations.

Referring to FIG. 2B, one implementation includes block 291. In block 291, one or more objects corresponding to those of events 126 published responsive to updates of records 112 in first DBO 102 (e.g., event 126C published responsive to the update of record 112B in first DBO 102A) are included in the payload of the block added to the blockchain. Implementations might favor publishing events 126 responsive only to updates (and/or insertions) of records 112 when updates (and/or insertions) of records 112 are relatively higher frequency compared to deletions of records 112.

Events Published Responsive to Deletions

Figure 3A:
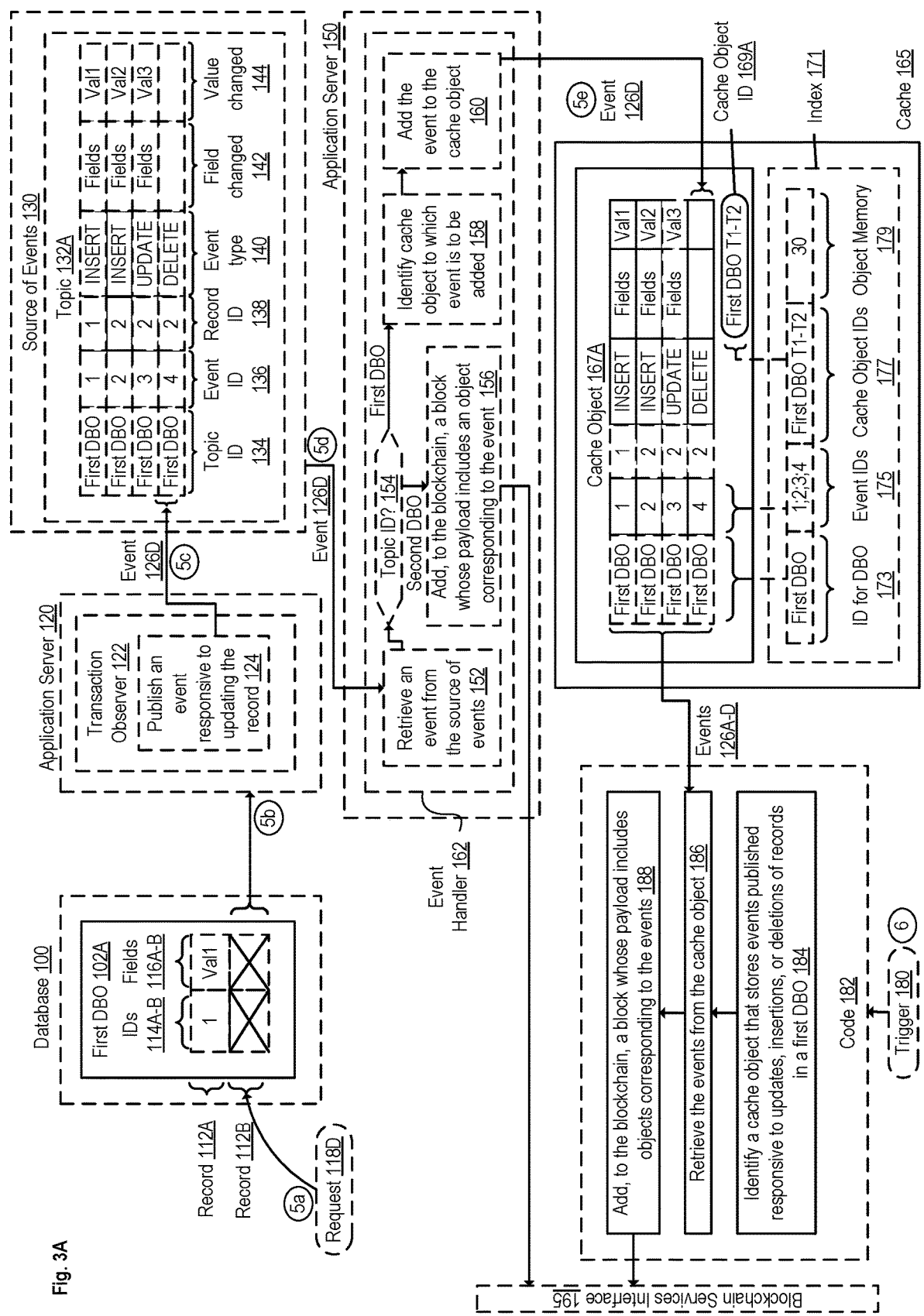
FIG. 3A is a block diagram that shows a system for using a cache to store events, published responsive to insertions, updates, or deletions of records in a database, for adding corresponding objects in a blockchain, according to some implementations.

FIG. 3A is a block diagram that shows a system for using a cache to store events, published responsive to insertions, updates, or deletions of records in a database, for adding corresponding objects in a blockchain, according to some implementations. Elements shown in FIG. 3A with reference numbers common to elements shown in FIGS. 1A-2B have been described referring to same.

At time 5a (indicated by circled reference "5a"), request 118D is submitted to database 100. Responsive to database 100 receiving request 118D, record 112B is deleted in first DBO 102A (indicated with an "X" shown in each of ID 114B and field 116B).

At time 5b, the deletion of record 112B is indicated to application server 120. Indicating a deletion of a record 112 to application server 120 was described referring to FIG. 1A.

At time 5c, block 124 is executed. Block 124 includes publishing event 126D to source of events 130 responsive to deletion of record 112B. As shown in source of events 130, event 126D is associated with topic 132A. For purposes of illustration, event 126A, event 126B, and event 126C are also shown in source of events 130, and associated with topic 132A.

Event 126D includes the following attributes and corresponding values: 1) a value of "First DBO" for topic ID 134 (corresponding to an ID for first DBO 102A in which record 112B was deleted); 2) a value of "4" for event ID 136; 3) a value of "2" for record ID 138 (corresponding to the value "2" for ID 114B of record 112B); and 4) a value of "DELETE" for event type 140 (indicating that record 112B was deleted in first DBO 102A).

At time 5d, event 126D is retrieved from the source of events 130 in block 152. From block 152, flow passes to block 154 which includes determining that event 126D includes a topic ID with a value of "First DBO" (e.g., which indicates that event 126D is to be cached). Accordingly, flow passes from block 154 to block 158, and from block 158 to block 160, which were described referring to FIG. 1A.

At time 5e, event 126D is added to cache object 167A which, for purposes of illustration, also includes event 126A, event 126B, and event 126C (described referring to FIG. 1A and FIG. 2A). Index 171 also shows an entry with event IDs 175 with a value of "1;2;3;4" corresponding to the values of event ID 136 for event 126A, event 126B, event 126C, and event 126D stored in cache object 167A.

At time 6, trigger 180 causes code 182 to be executed. Trigger 180 and code 182 were described referring to FIG. 1A and FIG. 1B. In one implementation, code 182 includes block 189 in addition or as an alternative to block 188.

Figure 3B:
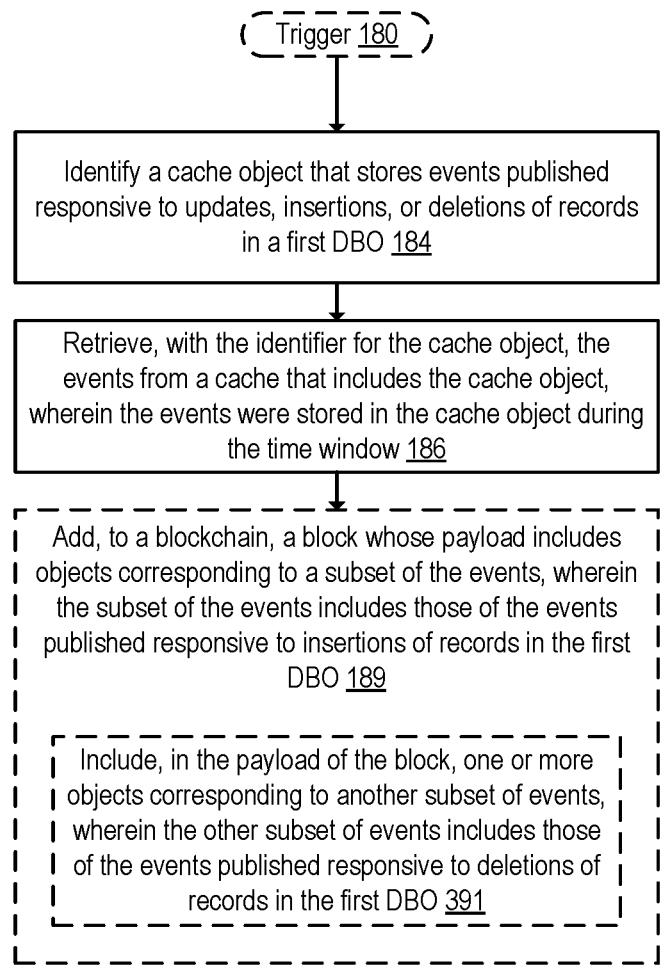
FIG. 3B is a flow diagram that shows operations for retrieving events from a cache and adding, in a blockchain, objects corresponding to the events published responsive to insertions, updates, or deletions of records in the database, according to some implementations.

Referring to FIG. 3B, one implementation includes block 391. In block 391, one or more objects corresponding to those of events 126 published responsive to deletions of records 112 in first DBO 102 (e.g., event 126D published responsive to the deletion of record 112B in first DBO 102A) are included in the payload of the block (e.g., block 642) added to the blockchain (e.g., blockchain 699).

Implementations are described herein that include, in the payload of the block added to the blockchain, objects corresponding to those of the events 126 published responsive to insertions, updates, and/or deletions of records 112 in a DBO 102. One should note that the examples shown are illustrative and not limiting. Different implementations may allow for including in a block's payload multiple events 126 published responsive to 1) one or more of insertions, updates, and/or deletions of records 112; 2) for one or more DBOs 102 (and, relatedly, adding such events 126 to a cache 165, retrieving such events 126 from the cache 165, etc.). For example, an implementation may support including multiple events 126 that correspond to insertions of records 112 in a first DBO 102A; another implementation may support including those events, together with other events 126 that correspond to updates of records 112 in a second DBO 102B; a third implementation may support including events 126 that correspond to insertions of records 112 in a first DBO 102A in the payload of one block 642, including events 126 that correspond to updates of records 112 in a second DBO 102B in the payload of a second block 642, and not including events corresponding to updates, insertions, or deletions of other records 112 in the first DBO 102A; etc. Allowing support for including different events 126 in a block added to a blockchain provides for finer-grained performance tuning of a system, amongst other advantages.

Multiple Database Objects

Figure 4A:
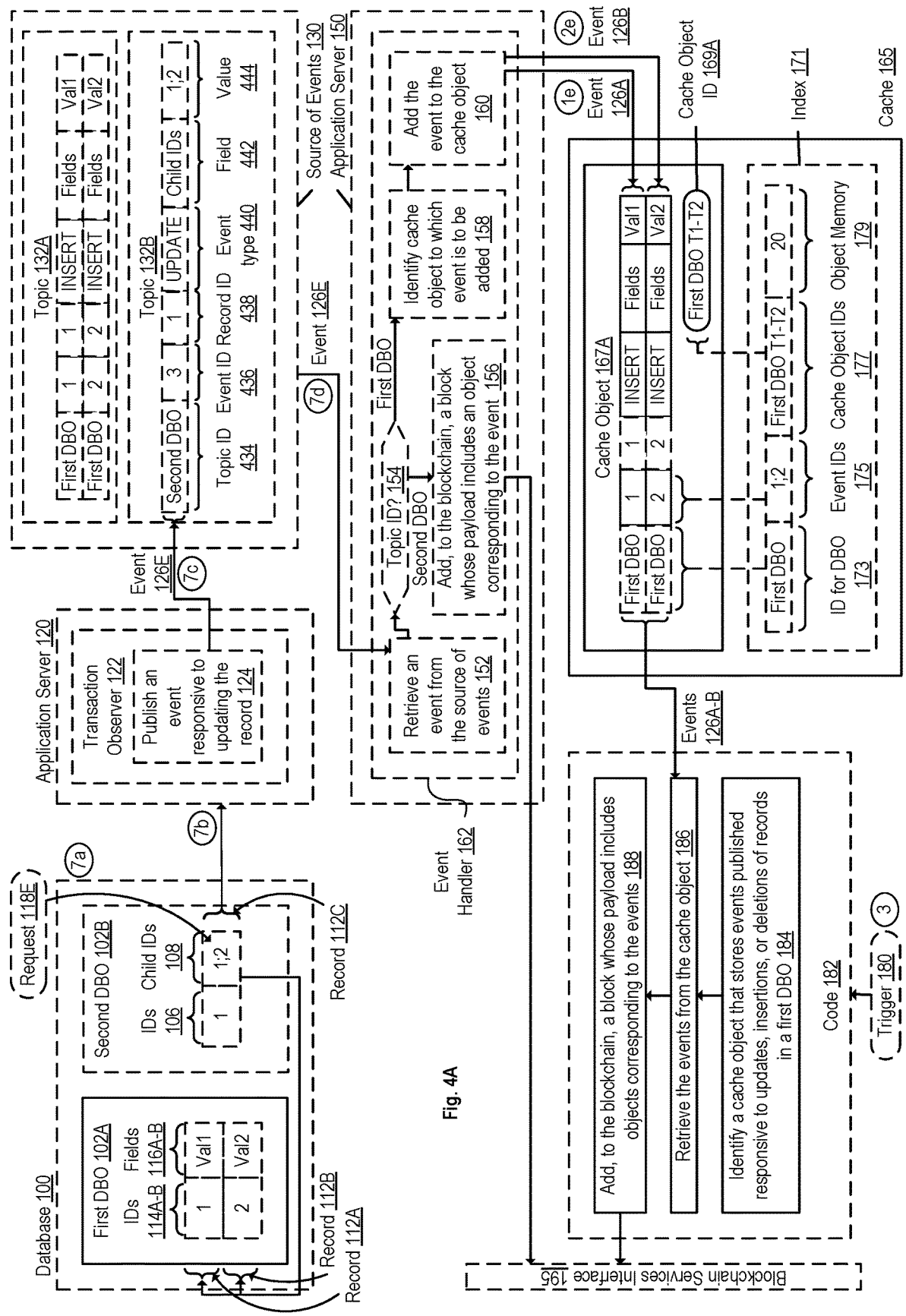
FIG. 4A is a block diagram that shows a system for adding, in a blockchain, objects corresponding to events published responsive to updates, insertions, or deletions in either of two database objects, where a cache is used to store events relating to one of the two database objects, according to some implementations.

FIG. 4A is a block diagram that shows a system for adding, in a blockchain, objects corresponding to events published responsive to updates, insertions, or deletions in either of two database objects, where a cache is used to store events relating to one of the two database objects, according to some implementations.

As previously discussed, implementations may include DBOs 102 in which records are updated, inserted, or deleted with differing frequencies. Configuring an implementation such that one or more of updates, insertions, and deletions, to records of one or more DBOs 102 are cached in cache 165, provides flexibility for tuning the application to maximize performance (e.g., by electing one or more DBOs 102 for which to cache events 126 published responsive to changes therein). FIG. 4A shows an implementation in which events 126 published responsive to updates, insertions, or deletions in a first DBO 102A are cached in cache 165, whereas events 126 published responsive to updates, insertions, or deletions in a second DBO 102B are not cached.

Second DBO 102B in database 100 includes IDs 106 and child IDs 108. Child IDs 108A-B indicate identifiers in one or more records of first DBO 102A. Responsive to request 118E being received at time 7a, record 112C is updated such that it includes the value of "1" for IDs 106 and the value of "1;2" for child IDs 108. As the arrows from record 112C to each of record 112A and record 112B indicate, child IDs 108 references record 112A (with the value of "1" for ID 114A) and record 112B (with the value of "2" for ID 114B).

At time 7b, the update of record 112C is indicated to application server 120.

At time 7c, block 124 is executed. Block 124 includes publishing event 126E to source of events 130 responsive to the update of record 112C. As shown in source of events 130, event 126E is associated with topic 132B. For purposes of illustration, event 126A and event 126B are also shown in source of events 130, and associated with topic 132A. In other implementations, event 126E might be associated with the same topic ID 134 as event 126A and event 126B despite events 126A-B relating to an insertion in first DBO 102A where event 126E relates to an update in second DBO 102B. For example, event 126A, event 126B, and event 126E might be associated with a topic reflecting that each such event reflects a change in database 100.

Event 126E includes the following attributes and corresponding values: 1) a value of "Second DBO" for topic ID 134 (corresponding to an ID for second DBO 102B in which record 112C was updated); 2) a value of "3" for event ID 136; 3) a value of "1" for record ID 138 (corresponding to the value "1" for ID 106 of record 112C); 4) a value of "UPDATE" for event type 140 (indicating that record 112C was updated in second DBO 102B); 5) a value of "Child IDs" for field 442 (reflecting that a field with an ID of "Child IDs" of second DBO 102B was updated in record 112C); and 6) a value of "1;2" for value 444 (corresponding to the updated value of child IDs 108 in record 112C).

At time 7d, event 126E is retrieved from the source of events 130 in block 152. From block 152, flow passes to block 154 which includes determining that event 126E includes a topic ID with a value of "Second DBO" (e.g., which indicates that event 126E is not to be cached). Accordingly, flow passes from block 154 to block 156.

In block 156, a block (e.g., block 642 shown in FIG. 6B) whose payload includes an object corresponding to event 126E is added to a blockchain (e.g., blockchain 699 shown in FIG. 6B), via blockchain services interface 195. Thus, in one implementation, event 126E is not cached in cache 165 and is not added together with other events 126 in block 188 or the like (e.g., block 189). Not caching event 126E reduces the additional storage that caching an event 126 in cache 165 represents, and the additional processing that executing code 182 in respect of an event 126 represents. Moreover, adding an object corresponding to event 126E in a block (e.g., block 642) means that the block only includes one such object, compared to including multiple objects corresponding to multiple events 126. This may simplify management of the corresponding object because the block containing the object contains only one object. Such an approach may be appropriate where updates, insertions, or deletions in the second DBO 102B are less frequent than the updates, insertions, or deletions in the first DBO 102A.

FIG. 4B is a flow diagram that shows operations for retrieving events from a cache and adding, in a blockchain, objects corresponding to the events published responsive to insertions, updates, or deletions of records in multiple database objects in the database, according to some implementations.

Responsive to trigger 180, block 480 is performed. Block 480 includes processing each DBO 102 for which an event 126 was published responsive to an update, insertion, or deletion of a record 112 in the DBO 102, where the event was stored in the cache 165. Block 480 includes block 484, block 186, and block 488.

In block 484, a cache object 167 is identified that stores events 126 published responsive to the updates, insertions, or deletions of records in the DBO 102. From block 484, flow passes to block 186, which was described previously. From block 186, flow passes to block 488 if implemented.

In block 488, a block whose payload includes objects corresponding to the events 126 for the DBO 102 is added to a blockchain. From block 480, flow passes to block 490, if implemented.

In block 490, a block whose payload includes objects corresponding to the events 126 for all of the DBOs 102 is added to the blockchain.

Thus, implementations shown and described referring to FIG. 4B can provide two modes of including objects corresponding to events 126 in a block (e.g., block 642) added to a blockchain (e.g., blockchain 699): 1) a block per DBO 102 (i.e., through execution of block 480); or 2) a block for all DBOs 102 (i.e., through execution of block 490). Other implementations are within the spirit and scope of the present disclosure. For example, one implementation could include a block per DBO 102 for those of the events 126 that correspond to either updates, insertions, or deletions of records 112 in that DBO 102. These different modalities allow for finer grained control over how objects are stored in the blockchain.

Multiple Cache Objects

Figure 5A:
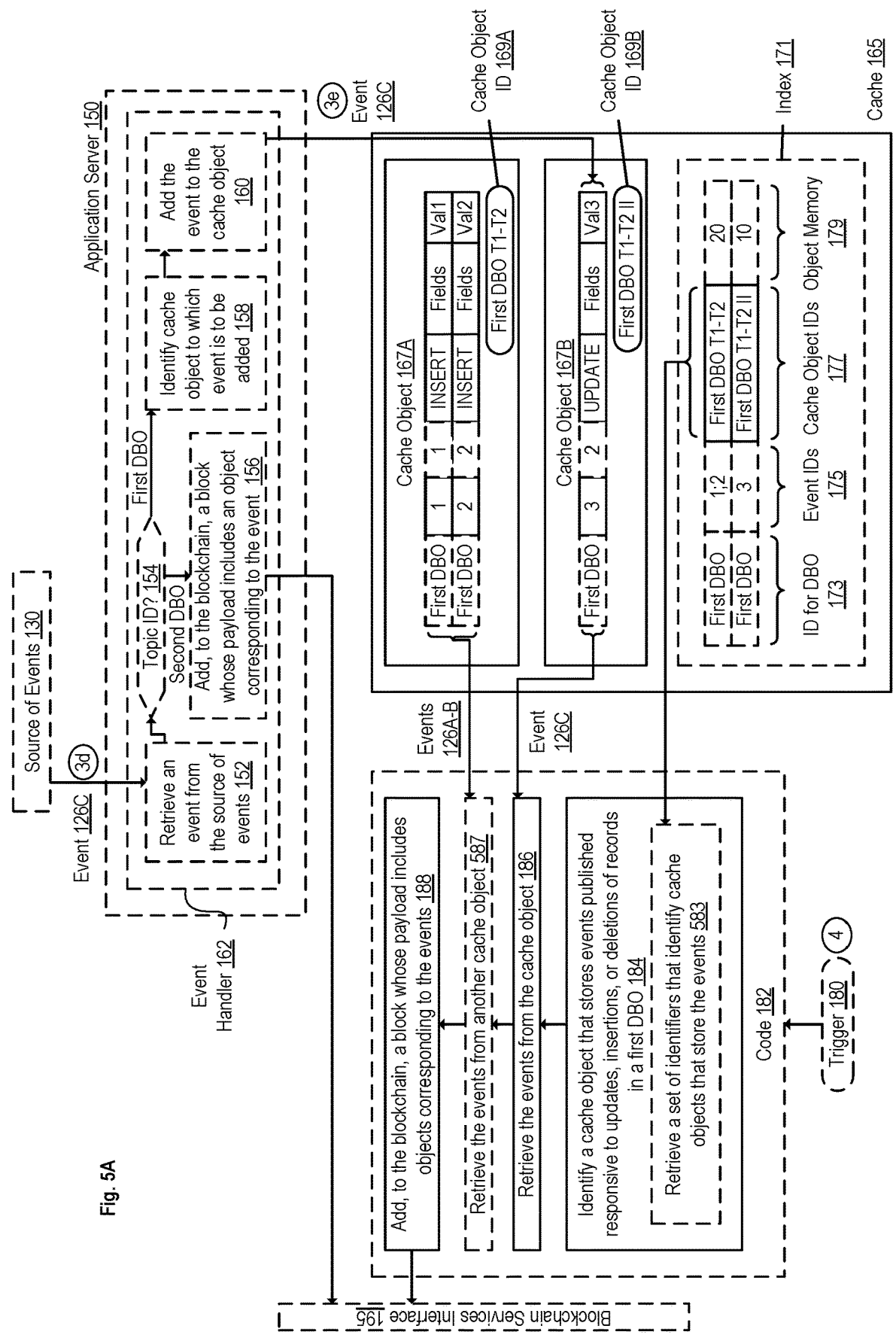
FIG. 5A is a block diagram that shows a system for using multiple cache objects in a cache to store events, published responsive to insertions, updates, or deletions of records in a database, for adding corresponding objects in a blockchain, according to some implementations.

FIG. 5A is a block diagram that shows a system for using multiple cache objects 167 in a cache to store events 126, published responsive to insertions, updates, or deletions of records 112 in a database 100, for adding corresponding objects in a blockchain, according to some implementations.

FIG. 5A shows application server 150, event handler 162, and blocks 152, 154, 156, 158, and 160 as shown in other figures. Also, FIG. 5A shows retrieving an event 126C from source of events 130 at time 3d, as shown and described referring to FIG. 2A. However, in block 158, cache object 167B and not cache object 167A is identified as the cache object 167 to which event 126C is to be added. In one implementation, cache 165 includes cache object 167A, and further includes cache object 167B that stores those of events 126 that are stored in the cache 165 after cache object 167A exceeds a size (e.g., a size of "20" as indicated in the value of object memory 179 for the entry corresponding to cache object 167B). Restricting a cache object 167 to a maximum size facilitates management of the cache objects 167 and/or cache 165.

Creating a second cache object (e.g., cache object 167B) may occur in different ways. In one implementation, block 158 may identify a cache object 167 whose size would be exceeded by adding an event 126 (e.g., cache object 167A with cache object ID 177 with a value of "First DBO T1-T2"). Then, in block 160, adding the event 126 to the identified cache object 167 may fail because the size of the cache object 167 is exceeded. Responsive to this failure, block 160 (or block 158) may identify another cache object 167 in which to store the event 126 (e.g., cache object 167B with cache object ID 177 with a value of "First DBO T1-T2 II"). This other cache object 167 may be created by event handler 162, or by cache 165 itself, responsive to block 160 adding the event 126 to the other cache object 167.

In another implementation, a service might monitor cache 165, detect when a cache object 167 exceeds a given size and/or another metric relating to the cache is exceeded (e.g., insertions per time interval), and create a cache object. In one implementation, creating the cache object may be created by calling an API endpoint on cache 165.

As FIG. 5A shows, after event 126C is stored in cache 165, cache 165 includes two cache objects 167: 1) cache object 167A which includes events 126A-B (discussed previously); and 2) cache object 167B which includes event 126C. In implementations which include index 171, index 171 includes an entry for each of cache object 167A and cache object 167B.

The entry for cache object 167A includes 1) ID for DBO 173 with a value of "First DBO" (corresponding to the topic ID 134 with value "First DBO" for event 126A and event 126B); 2) event IDs 175 with a value of "1;2" (corresponding to the event ID 136 for event 126A and event 126B, respectively); 3) cache object ID 177 with a value of "First DBO T1-T2" (corresponding to cache object ID 169A, with a value of "First DBO T1-T2" for cache object 167A); and 4) object memory 179 with a value of "20."

The entry for cache object 167B includes 1) ID for DBO 173 with a value of "First DBO" (corresponding to the topic ID 134 with value "First DBO" for event 126C); 2) event IDs 175 with a value of "3" (corresponding to the event ID 136 for event 126C); 3) cache object ID 177 with a value of "First DBO T1-T2 II" (corresponding to cache object ID 169B, with a value of "First DBO T1-T2 II" for cache object 167B); and 4) object memory 179 with a value of "10."

At time 4, code 182 is executed responsive to trigger 180. In the implementation shown in FIG. 5A, code 182 includes block 583 and block 587 in addition to the blocks 184, 186, and 188 described previously.

Block 583 includes retrieving a set of identifiers that identify cache objects 167 that store the events 126. In the example shown, block 583 includes retrieving cache object IDs 177 (with values of "First DBO T1-T2" and "First DBO T1-T2 II"), as the arrow between cache object IDs 177 and block 583 indicates. From block 184, flow passes to block 186.

Block 186 was described previously. In the example shown, block 186 includes retrieving event 126C from cache object 167B. From block 186, flow passes to block 587.

In block 587, events 126 are retrieved from the other cache object 167. For example, events 126A-B are retrieved from cache object 167A. From block 587, flow passes to block 188, which was described previously.

FIG. 5B is a flow diagram that shows operations for retrieving events from multiple cache objects in a cache and adding, in a blockchain, objects corresponding to the events published responsive to insertions of records in the database, according to some implementations. Trigger 180, block 184, block 186, and block 189 were described previously.

Implementations may include block 584. Block 584 includes retrieving, from the cache 165 that includes the cache object 167, IDs 169 that identify cache objects 167 that store the events 126, wherein the identifiers includes the ID 169 for the cache object 167. For example, block 584 may include retrieving cache object IDs 177 from index 171 included in cache 165 shown in FIG. 5A.

Additionally or alternatively, block 184 may include block 585. In block 585, an ID 169 for the cache object 167 is determined based on an ID for the first DBO 102 and a time of execution of a job which performs block 585. Referring to the example shown in FIG. 5A, cache object ID 169A (with value "First DBO T1-T2") and cache object ID 169B (with value "First DBO T1-T2 II") can be determined based on an ID for first DBO 102A (i.e. "First DBO") and a time of execution of a job (as described referring to FIG. 1A). In one implementation, cache 165 could be queried with the determined value of "First DBO T1-T2" and the IDs 169A-B with respective values "First DBO T1-T2" and "First DBO T1-T2 II" returned. It should be noted that implementations may include block 584 and/or block 585 regardless whether the implementations support cache 165 including multiple cache objects 167.

From block 184, flow passes to block 186, which has been described previously. From block 186, flow passes to block 588.

In block 588, the other cache object 167 (e.g., cache object 167B in FIG. 5A) stores those of the events 126 (e.g., event 126C in FIG. 5A) that were stored in the cache 165 after the cache object 167 (e.g., cache object 167A in FIG. 5A) exceeded a size (e.g., a size of value "20" shown in FIG. 5A). From block 588, flow passes to block 189, which was described previously.

Example Blockchains and Related Services

Figure 6A:
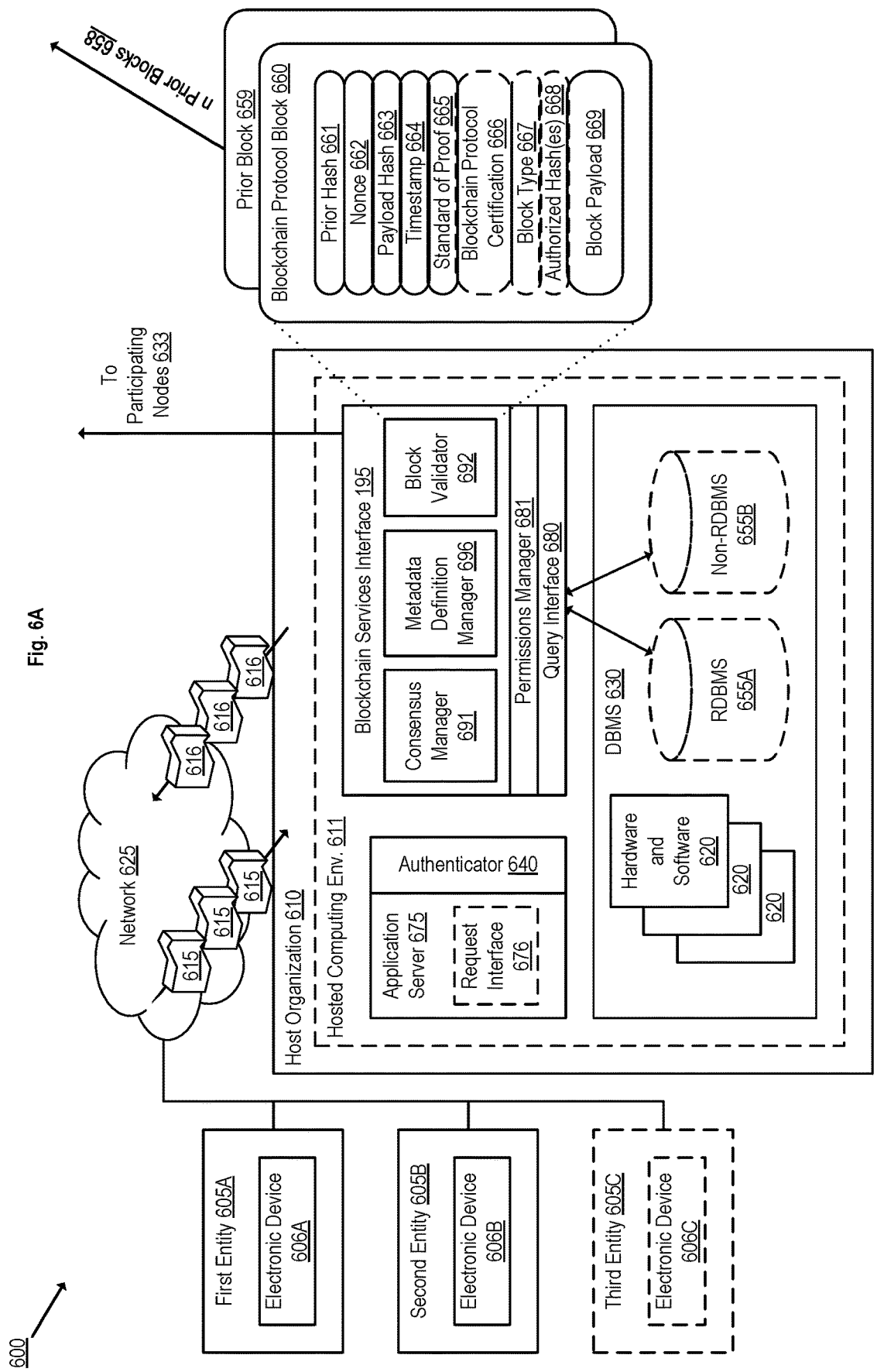
FIG. 6A is a block diagram that shows a blockchain architecture, together with a blockchain protocol block operation with a block validator, according to some implementations.

FIG. 6A is a block diagram that shows a blockchain architecture, together with a blockchain protocol block operation with a block validator, according to some implementations.

In one implementation, a hosted computing environment 611 is communicably interfaced with user devices 606A-C (e.g., such as mobile devices, smart phones, tablets, PCs, etc.) through host organization 610. In one implementation, a database system 630 includes databases 655A and 655B, for example, to store code, object data, tables, datasets, and underlying database records including user data on behalf of customer organizations 605A-C (e.g., users of such a database system 630 or tenants of a multi-tenant database type database system or the affiliated users of such a database system). Such databases include various database system types including, for example, a relational database system 655A and a non-relational database system 655B according to certain implementations. One or both of relational database system 655A and non-relational database system 665B may include database 100 shown in FIG. 1A, FIG. 2A, FIG. 3A, FIG. 4A, and FIG. 5A.

In certain implementations, a client-server computing architecture may be used to supplement features, functionality, or computing resources for the database system 630 or alternatively, a computing grid, or a pool of work servers, or some combination of hosted computing architectures may provide some or all of computational workload and processing demanded of the host organization 610 in conjunction with the database system 630.

The database system 630 depicted in the implementation shown includes a plurality of underlying hardware and software 620 that implement database functionality and a code execution environment within the host organization 610.

In accordance with one implementation, database system 630 utilizes the underlying database system implementations 655A and 655B to service database queries and other data interactions with the database system 630 that communicate with the database system 630 via the query interface 680. The hardware and software 620 of the database system 630 are separate and distinct from the customer organizations (605A, 605B, and 605C) which use web services and other service offerings as provided by the host organization 610 by communicably interfacing to the host organization 610 via network 625. In such a way, host organization 610 may implement on-demand services, on-demand database services or cloud computing services to subscribing customer organizations 605A-C.

In one implementation, each customer organization 605A-C is an entity selected from the group consisting of: a separate and distinct remote organization, an organizational group within the host organization 610, a business partner of the host organization 610, or a customer organization 605A-C that subscribes to cloud computing services provided by the host organization 610.

Further depicted is the host organization 610 receiving input and other requests 615 from customer organizations 605A-C via network 625 (such as a public Internet). For example, incoming search queries, database queries, API requests, interactions with displayed graphical user interfaces and displays at the user devices 606A-C, or other inputs may be received from the customer organizations 605A-C to be processed against the database system 630, or such queries may be constructed from the inputs and other requests 615 for execution against the databases 655 or the query interface 680, pursuant to which results 616 are then returned to an originator or requestor, such as a user of one of a user device 606A-C at a customer organization 605A-C.

In one implementation, requests 615 are received at, or submitted to, an application server 675 within host organization 610. Host organization 610 may receive a variety of requests for processing by the host organization 610 and its database system 630. Incoming requests 615 received at application server 675 may specify which services from the host organization 610 are to be provided, such as query requests, search request, status requests, database transactions, graphical user interface requests and interactions, processing requests to retrieve, update, or store data on behalf of one of the customer organizations 605A-C, code execution requests, and so forth. Applications server 675 may be responsible for receiving requests 615 from various customer organizations 605A-C via network 625 on behalf of the query interface 680 and for providing a web-based interface or other graphical displays to an end-user user device 606A-C or machine originating such data requests 615.

Certain requests 615 received at the host organization may be directed toward a blockchain for which the blockchain services interface 195 of the host organization 610 operates as an intermediary.

The query interface 680 is capable of receiving and executing requested queries against the databases (e.g., a request 118) and storage components of the database system 630 and returning a result set, response, or other requested data in furtherance of the methodologies described. The query interface 680 additionally provides functionality to pass queries from application server 675 into the database system 630 for execution against the databases 655 for processing search queries, or into the other available data stores of the host organization's computing environment 611. In one implementation, the query interface 680 implements an API through which queries may be executed against the databases 655 or the other data stores. Additionally, the query interface 680 provides interoperability with the blockchain services interface 195, thus permitting the host organization 610 to conduct transactions with either the database system 630 via the query interface 680 or to transact blockchain transactions onto a connected blockchain for which the host organization 610 is a participating node or is in communication with the participating nodes 633, or the host organization 610 may conduct transactions involving both data persisted by the database system 630 (accessible via the query interface 680) and involving data persisted by a connected blockchain (e.g., accessible from a participating node 633 or from a connected blockchain directly, where the host organization operates a participating node on such a blockchain).

In certain implementations, the API of the query interface 680 provides an API model through which programmers, developers, and administrators may interact with the blockchain services interface 195 or the database system 630, or both, as the needs and particular requirements of the API caller dictate.

Host organization 610 may implement a request interface 676 via application server 675 or as a stand-alone interface to receive requests packets or other requests 615 from the user devices 606A-C. Request interface 676 further supports the return of response packets or other replies, responses, and results 616 in an outgoing direction from host organization 610 to the user devices 606A-C. Authenticator 640 operates on behalf of the host organization to verify, authenticate, and otherwise credential users attempting to gain access to the host organization 610.

Further depicted within host organization 610 is the blockchain services interface 195 having included therein both a blockchain consensus manager 691 which facilitates consensus management for private and public blockchains upon which tenants, customer organizations, or the host organization itself 610 operate as a participating node 633 on a supported blockchain. Additionally depicted is the blockchain metadata definition manager 696, which enables the blockchain services interface 195 to define and create metadata (e.g., metadata 694) which is then pushed to and transacted onto a blockchain which is interfaced via the blockchain services interface 195. For instance, via the blockchain metadata definition manager 696, any customer organization 605A-C of the host organization 610 may define and create metadata which is then recorded or transacted onto the blockchain for use by that customer organization 605A-C and for use by other participating nodes 633 on the blockchain, regardless of whether or not those participating nodes 633 are also customer organizations 605A-C with the host organization 610. For example, once metadata is defined and created via the blockchain metadata definition manager 696 and pushed onto the blockchain, any participating node 633 with access to the blockchain where that metadata definition resides can then create data records and store information onto the blockchain which adopts the defined metadata definition and thus complies with the newly created metadata definition. In such a way, all participating nodes 633 can utilize information which is stored in compliance with the newly created metadata definition, as there is a standardized (albeit customized) manner for storing such data.

In one implementation, the blockchain consensus manager 691 and blockchain metadata definition manager 696 work in conjunction to implement consensus on read. A consensus on read is a specific type of consensus for controlling read access to data stored on the blockchain. Data is stored in an encrypted format where the encryption key is distributed as a shared secret with other nodes in the blockchain platform. The nodes of the network perform a consensus on read operation when a request to access the data is made. The consensus on read process examines the credentials or any configured criteria that is determined to be required, which is provided in the access request. Each node that approves of the read access responds with its portion of the shared secret that enables the requesting node to generate the key from the shared secrets to decrypt the data on the blockchain and access the data. A threshold number of secrets must be returned to enable access to the encrypted data. The threshold number can be configured and/or determined by the shared secret algorithm (e.g., Shamir's secret sharing algorithm).

In further implementations, a permissions manager 681 operates to enforce access controls and privileges as defined in metadata for data stored in the blockchain. The permissions manager 681 can enforce record, object, field or similar levels of granularity on access control including read and write access controls. The permissions manager 681 can enforce management of the blockchain data based on metadata defining access privileges based on a unique user identifier (UUID) or similar entity identifier. The metadata can define a list of entities with permission to read or write data in the blockchain. The metadata can also define a set of owners that control the consensus on read process that is used to manage the access to access controlled information. In some implementations, the permissions manager can implement a right to forget process (e.g., in compliance with European Union general data protection regulation (GDPR)) or similar process to 'erase' data from the blockchain.

As shown here, the blockchain services interface 195 communicatively interfaces the host organization 610 with other participating nodes 633 (e.g., via the network 625) so as to enable the host organization 610 to participate in available blockchain protocols by acting as a blockchain protocol compliant node, which in turn, permits the host organization 610 to access information within such a blockchain as well as enabling the host organization 610 to provide blockchain services to other participating nodes 633 for any number of blockchain protocols supported by, and offered to customers and subscribers by, the host organization 610. In certain implementations, the host organization 610 both provides the blockchain protocol upon which the host organization 610 then also operates as participating node 633. In other implementations, the host organization 610 merely operates as a participating node 633 so as to enable the host organization 610 to interact with the blockchain protocol(s) provided by others.

According to certain implementations, the blockchain metadata definition manager 696 additionally permits non-subscribers (e.g., entities which are not customer organizations 605A-C) of the host organization 610 to nevertheless utilize the blockchain metadata definition manager 696 and Graphical User Interfaces (GUIs) associated with the blockchain metadata definition manager 696 via an exposed API interface for such non-subscribing customers which may then create and define metadata definitions which are then pushed onto the blockchain via the host organization's blockchain services interface 195.

By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system may be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high Byzantine fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 610 provides a wide array of data processing and storage services, including the capability of providing vast amounts of data with a single responsible agent, such as the host organization 610, blockchain services differ insomuch that the host organization 610 is not a single authority for such services, but rather, via the blockchain services interface 195, is merely one of many nodes for an available blockchain protocol or operates as blockchain protocol manager and provider, while other participating nodes 633 communicating with the host organization 610 via blockchain services interface 195 collectively operate as the repository for the information stored within a blockchain by implementing compliant distributed ledger technology (DLT) in accordance with the available blockchain protocol offered by the host organization 610.

The decentralized blockchain may use ad-hoc message passing and distributed networking. The blockchain network lacks centralized points of vulnerability that computer hackers may exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing such data, blockchain makes data transparent to everyone involved.

Every participating node 633 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 633 are trusted more than any other, although this default may be altered via certain specialized blockchain protocols as will be described in greater detail below. Blockchain transactions are broadcast to the network using software, via which any participating node 633, including the host organization 610 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be used in conjunction with the various blockchain protocols offered by and supported by the host organization, with such consensus mechanisms including, for example proof-of-stake, proof-of-authority and proof-of-burn, to name a few.

Open blockchains are more user friendly than conventional traditional ownership records, which, while open to the public, still require physical access to view. Because most of the early blockchains were permission-less, there is some debate about the specific accepted definition of a so called "blockchain," such as, whether a private system with verifiers tasked and authorized (permissioned) by a central authority is considered a blockchain. Proponents of permissioned or private chains argue that the term blockchain may be applied to any data structure that groups data into time-stamped blocks. These blockchains serve as a distributed version of multi-version concurrency control (MVCC) in databases. Just as MVCC prevents two transactions from concurrently modifying a single object in a database, blockchains prevent two transactions from spending the same single output in a blockchain. Regardless of the semantics or specific terminology applied to the varying types of blockchain technologies, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 195 of the host organization 610, both private and public mechanisms are described herein and utilized as needed for different implementations supported by the host organization 610.

An advantage to an open, permission-less, or public, blockchain network is that guarding against bad actors is not required and no access control is needed. This means that applications may be added to the network without the approval or trust of others, using the blockchain as a transport layer. Conversely, permissioned (e.g., private) blockchains use an access control layer to govern who has access to the network. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

Figure 6B:
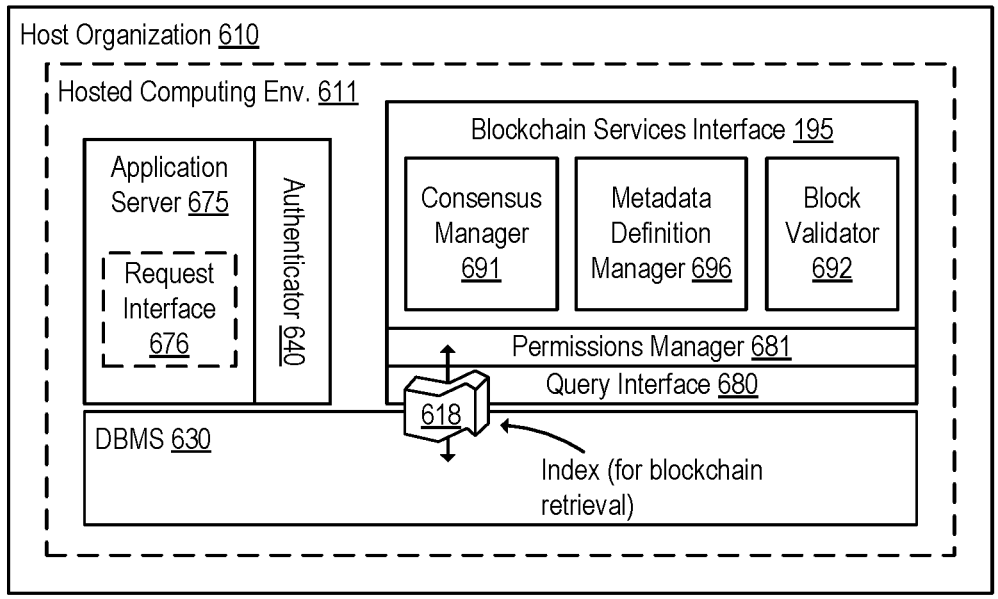
FIG. 6B is a block diagram that shows another blockchain architecture and blocks in a blockchain, according to some implementations.
Figure 6B:
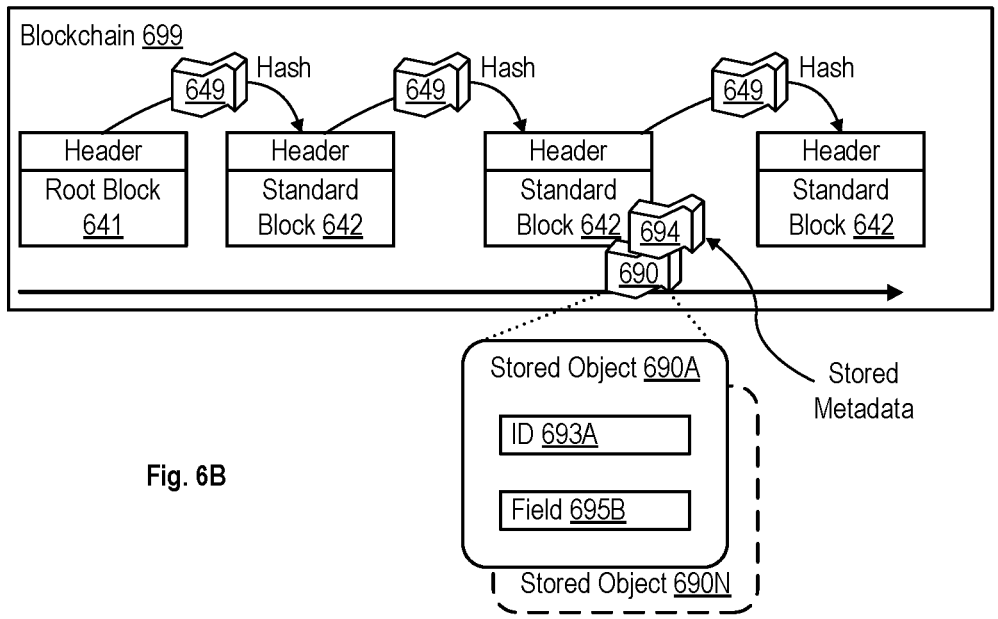

FIG. 6B also shows a blockchain protocol block 660 operating in conjunction with a block validator 692, according to some implementations. The blockchain consensus manager 691 implements consensus on read and the permissions manager 681 support access control and similar operations as described.

In particular, a blockchain protocol block 660 is depicted here to be validated by the block validator 692 of the host organization 610, with the blockchain protocol block including addition detail of its various sub-components, and certain optional elements which may be utilized in conjunction with the blockchain protocol block 660 depending on the particular blockchain protocol being utilized via the blockchain services interface 195.

In accordance with one implementation, the blockchain protocol block 660 shown defines a particular structure for how the fundamental blocks of any given blockchain protocol supported by the host organization 610 is organized.

According to some implementations, blockchain metadata definition manager 696 as shown may use a specific blockchain implementation which is provided by the host organization 610 and thus, for which the applicable blockchain protocol is defined by the host organization 610 or alternatively, the blockchain metadata definition manager 696 may use any publicly accessible blockchain for which the host organization operates as a participating node so as to establish access or the blockchain metadata definition manager 696 may use a private blockchain, including those which are not provided by the host organization 610, so long as the host organization is able to authenticate with such a private blockchain and access the blockchain by operating as a participating node on the private blockchain.

As described in greater detail below, the blockchain metadata definition manager 696 implements a specialized metadata definition and creation scheme which may include the use of GUIs and other user-friendly interfaces which are provided by the host organization 610 either via an API or via an interface of the host organization, such as the application server 675 via which users and customer organizations 605A-C may interact with the host organization 610 and more particularly, with the services and applications provided by the host organization 610, including use of GUIs provided by the blockchain metadata definition manager 696 which is made accessible to tenants of the host organization via the cloud computing platform and in certain implementations made available to non-tenants and non-subscribers of the host organization 610, either of which may then utilize the GUIs and functionality provided by the blockchain metadata definition manager 696.

In some implementations, the host organization 610 may need to provide a customized blockchain protocol implementation to support use of the specialized metadata definition and creation scheme as the blockchain metadata definition manager 696 implements. However, in implementations where the metadata may permissibly be defined and stored onto a blockchain by the host organization 610, any blockchain used to store such data will be unaffected as the blockchain is agnostic as to what types of metadata is defined or created and transacted onto the blockchain by the host organization 610. Put differently, while the host organization 610 facilitates the definition and creation of such metadata and transacts that information onto a blockchain, it is immaterial to the blockchain as to what applications elect to use such data, whereas the host organization 610 facilitates a platform in which applications may elect to only use data which is in compliance with the defined and created metadata, thus permitting transferability of such data, as well as other benefits.

With respect to the blockchain protocol block 660 (regardless of whether it is an existing and already available blockchain protocol or a custom implemented blockchain protocol), the prior hash 661 is the result of a non-reversible mathematical computation using data from the prior block 659 as the input. The prior block 659 in turn utilized data from the n previous block(s) 658 to form the non-reversible mathematical computation forming the prior hash for those respective blocks. For instance, according to one implementation, the non-reversible mathematical computation used is a SHA256 hash function, although other hash functions may be used. According to such an implementation, the hash function results in any change to data in the prior block 659 or any of the n previous blocks 658 in the chain, causing an unpredictable change in the hash of those prior blocks, and consequently, invalidating the present or current blockchain protocol block 660. Prior hash 661 creates the link between blocks, chaining them together to form the current blockchain protocol block 660.

When the block validator 692 calculates the prior hash 661 for the prior block 659, the hash must meet certain criteria defined by data stored as the standard of proof 665. For instance, in one implementation, this standard of proof 665 is a number that the calculated hash must be less than. Because the output of the hashing function is unpredictable, it cannot be known before the hash is calculated what input will result in an output that is less than the standard of proof 665. The nonce 662 is used to vary the data content of the block, allowing for a large number of different outputs to be produced by the hash function in pursuit of an output that meets the standard of proof 665, thus making it exceedingly computationally expensive (and therefore statistically improbable) of producing a valid block with a nonce 662 that results in a hash value meeting the criteria of the standard of proof 665.

Payload hash 663 provides a hash of the data stored within the block payload 669 portion of the blockchain protocol block 660 and need not meet any specific standard of proof 665. However, the payload hash is included as part of the input when the hash is calculated for the purpose of storing as the prior hash 661 for the next or subsequent block. Timestamp 664 indicates what time the blockchain protocol block 660 was created within a certain range of error. According to certain blockchain protocol implementations provided via the blockchain services interface 195, the distributed network of users (e.g., blockchain protocol nodes) checks the timestamp 664 against their own known time and will reject any block having a timestamp 664 which exceeds an error threshold, however, such functionality is optional and may be required by certain blockchain protocols and not used by others.

The blockchain protocol certification 666 defines the required size and/or data structure of the block payload 669 as well as certifying compliance with a particular blockchain protocol implementation, and thus, certifies the blockchain protocol block subscribes to, implements, and honors the particular requirements and configuration options for the indicated blockchain protocol. The blockchain protocol certification 666 may also indicate a version of a given blockchain protocol and the blockchain protocol may permit limited backward and forward compatibility for blocks before nodes will begin to reject new blockchain protocol blocks for non-compliance.

Block type 667 is optional depending on the particular blockchain protocol used. Where required for a specific blockchain protocol exposed via the blockchain services interface 195, a block type 667 must be indicated as being one of an enumerated list of permissible block types 667 as described in greater detail below. Certain blockchain protocols use multiple different block types 667, all of which may have varying payloads, but have a structure which is known a priori according to the blockchain protocol used, the declared block type 667, and the blockchain protocol certification 666 certifying compliance with such requirements. Non-compliance or an invalid block type or an unexpected structure or payload for a given declared block type 667 will result in the rejection of that block by network nodes.

Where a variable sized block payload 669 is used, the block type 667 may indicate permissibility of such a variable sized block payload 669 as well as indicate the index of the first byte in the block payload 669 and the total size of the block payload 669. The block type 167 may be used to store other information relevant to the reading, accessing, and correct processing and interpretation of the block payload 669.

Block payload 669 data stored within the block may relate to any number of a wide array of transactional data depending on the particular implementation and blockchain protocol used, including payload information related to, for example, financial transactions, ownership information, data access records, document versioning, medical records, voting records, compliance and certification, educational transcripts, purchase receipts, digital rights management records, inventory data, or literally any kind of data that is storable via a payload of a blockchain protocol block 660, which is essentially any data capable of being digitized. Depending on the particular blockchain protocol chosen, the payload size may be a fixed size or a variable size, which in either case, will be utilized as at least part of the input for the hash that produces the payload hash 663.

Various standard of proofs 665 may be used per the particular blockchain protocol chosen, such as proof of work, hash value requirements, proof of stake, a key, or some other indicator such as a consensus, or proof of consensus. Where consensus-based techniques are used, the blockchain consensus manager 691 provides consensus management on behalf of the host organization 610, however, the host organization 610 may be operating only as one of many nodes for a given blockchain protocol which is accessed by the host organization 610 via the blockchain services interface 195 or alternatively, the host organization 610 may define and provide a particular blockchain protocol as a cloud based service to customers and subscribers (and potentially to non-authenticated public node participants), via the blockchain services interface 195. Such a standard of proof 665 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 661, the payload hash 663, or the authorized hashes 668 may be all of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

FIG. 6B depicts another exemplary blockchain architecture, according to some implementations. In this example architecture, the blockchain consensus manager 691 and the permissions manager 681 operate to support consensus on read and access control processes as further described.

Host organization 610 includes the hosted computing environment 611 having processors and memory (e.g., within the execution hardware and software 620 of the database system 630), which serve to operate the blockchain services interface 195 including the blockchain consensus manager 691 and the blockchain metadata definition manager 696 which utilizes an index 618 by which to identify an addressable block of the blockchain 699 via which a desired object is stored. FIG. 6B also shows exemplary stored object(s) 690A-N at the second to last block of the blockchain 699.

Blockchain 699 begins with a root block 641 (sometimes called a genesis block) followed by a series of standard blocks 642, each having a header which is formed based at least in part from a hash of the header of the block which precedes it. In one implementation, one or more of standard blocks 642 corresponds to a blockchain protocol block 660 as shown in FIG. 6A. Because each block in the blockchain 699 contains a hash 649 of the immediately preceding block stored in the previous hash 649, a link going back through the chain from each block is effectively created via the blockchain 699 and makes maliciously modifying blockchain 699 prohibitively difficult or computationally infeasible.

Here, the stored object 690A stores an ID 693A and a field 695A, such as ID 114 and field 116 in a record 112 of first DBO 102A shown in FIG. 1A.

Once the stored object(s) 690 is added to (also referred to as transacted onto) the blockchain, for instance, by adding an asset to the blockchain within which the stored object(s) 690 is embodied, data is persistently stored by the blockchain and accessible to participating nodes with access to the blockchain 699, however, when such data is retrieved, the stored object does not in of itself describe how to use such data, any particular format for such data, or how to validate such data. Therefore, the blockchain may store metadata which may then be used to define the format, validation means, and use for such data. Storage of metadata may exacerbate the problem of searching for and retrieving data from the blockchain however, because the blockchain 699 stores stored object(s) 690 and also stored metadata 694 associated with that object. An organization methodology is thus provided by the indexing scheme as implemented by the blockchain metadata definition manager 696 in conjunction with use of the index 618 which provides for more efficient storage, retrieval, and validation of data stored on the blockchain.

According to one implementation, stored object(s) 690 is therefore converted to a more efficient format for storage within the blockchain. Consider stored object(s) 690 for which an ID 693 and a field 695 is stored. Initially, stored object(s) 690 may include only an ID 693 and field 695, and is then stored. Subsequently, the object is updated to include a different value of field 695 and thus, either stored object(s) 690 is updated and re-written to the blockchain 699 in its entirety thus creating a second copy, albeit updated, of stored object(s) 690 or alternatively, only the new portion, the updated field 695 is written to the blockchain 699 with a reference back to the prior object, in which case total storage volume is reduced, but retrieval of the entire object requires searching for and finding multiple blocks on the blockchain 699 from which to reconstruct the entire stored object(s) 690.

Example Electronic Devices and Environments

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices (also referred to as devices) are designed for and/or used for a variety of purposes, and different terms may reflect those purposes (e.g., user devices, network devices). Some user devices are designed to mainly be operated as servers (sometime referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, etc.). The software executed to operate a user device (typically a server device) as a server may be referred to as server software or server code), while the software executed to operate a user device (typically a client device) as a client may be referred to as client software or client code. A server provides one or more services to (also referred to as serves) one or more clients.

The term "user" refers to an entity (e.g., an individual person) that uses an electronic device, and software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 7A:
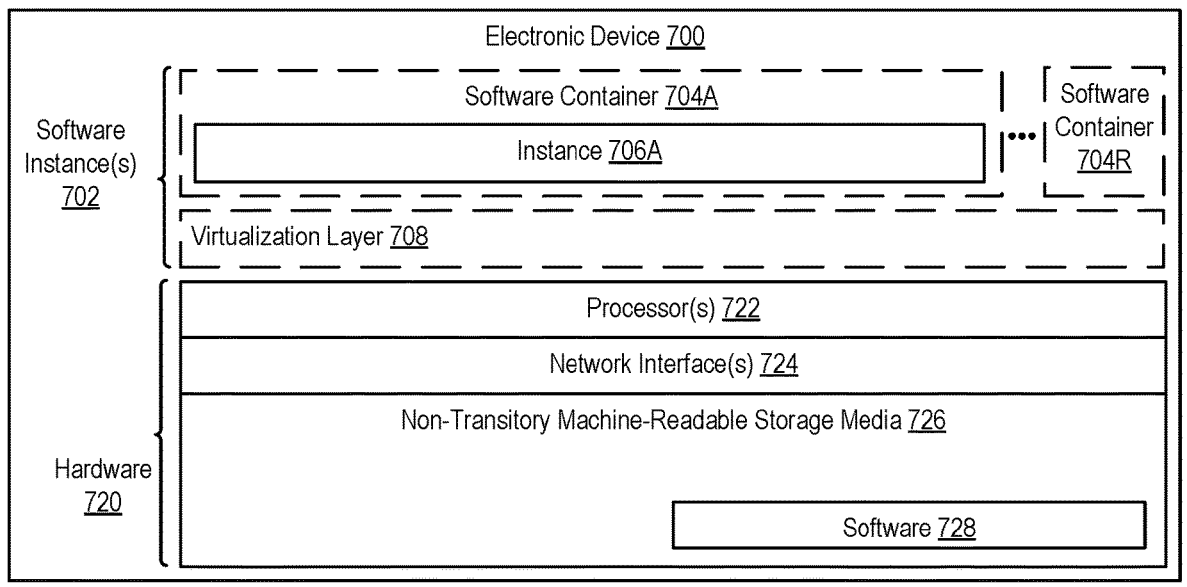
FIG. 7A is a block diagram illustrating an electronic device, according to some implementations.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and non-transitory machine-readable storage media 726 having stored therein software 728 (which includes instructions executable by the set of one or more processor(s) 722). One or more implementations described herein may be implemented as a service (e.g., a blockchain storage service). Each of the previously described database 100, application server 120, source of events 130, application server 150, cache 165, code 182, blockchain services interface 195, and blockchain 699 may be implemented in one or more electronic devices 700. In one implementation, the cache 165 and the code 182 can be part of a blockchain storage platform that offers a blockchain storage service. In some implementations, the blockchain storage platform may include the application server 150. In other implementations, one or more of database 100, application server 120, source of events 130, and blockchain services interface 195 are included in the blockchain storage platform, and the remainder are implemented as separate services to the blockchain storage platform. In one implementation, the blockchain storage service is available to one or more clients (e.g., clients of database 100). In one implementation: 1) each of the clients is implemented in a separate one of the electronic devices 700 (e.g., in end user devices where the software 728 represents the software to implement clients to interface directly and/or indirectly with the blockchain storage service (e.g., software 728 represents a web browser, a native client, a portal, a command-line interface, and/or an application programming interface (API) based upon protocols such as Simple Object Access Protocol (SOAP), Representational State Transfer (REST), etc.)); 2) the blockchain storage service is implemented in a separate set of one or more of the electronic devices 700 (e.g., a set of one or more server devices where the software 728 represents the software to implement the blockchain storage service); and 3) in operation, the electronic devices implementing the clients and the blockchain storage service would be communicatively coupled (e.g., by a network) and would establish between them (or through one or more other layers and/or or other services) connections for submitting requests 118 to the blockchain storage service and returning responses to the clients. Other configurations of electronic devices may be used in other implementations (e.g., an implementation in which the client and the blockchain storage service are implemented on a single electronic device 700).

During operation an instance of the software 728 (illustrated as instance 706A and also referred to as a software instance; and in the more specific case of an application, as an application instance) is executed. In electronic devices that use compute virtualization, the set of one or more processor(s) 722 typically execute software to instantiate a virtualization layer 708 and software container(s) 704A-R (e.g., with operating system-level virtualization, the virtualization layer 708 may represent a container engine (such as Docker Engine by Docker, Inc. or rkt in Container Linux by Red Hat, Inc.) running on top of (or integrated into) an operating system, and it allows for the creation of multiple software containers 704A-R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation an instance of the software 728 is executed within the software container 704A on the virtualization layer 708. In electronic devices where compute virtualization is not used, the instance 706A on top of a host operating system is executed on the "bare metal" electronic device 700. The instantiation of the instance 706A, as well as the virtualization layer 708 and software containers 704A-R if implemented, are collectively referred to as software instance(s) 702.

Alternative implementations of an electronic device may have numerous variations from that described above. For example, customized hardware and/or accelerators might also be used in an electronic device.

Example Environment

Figure 7B:
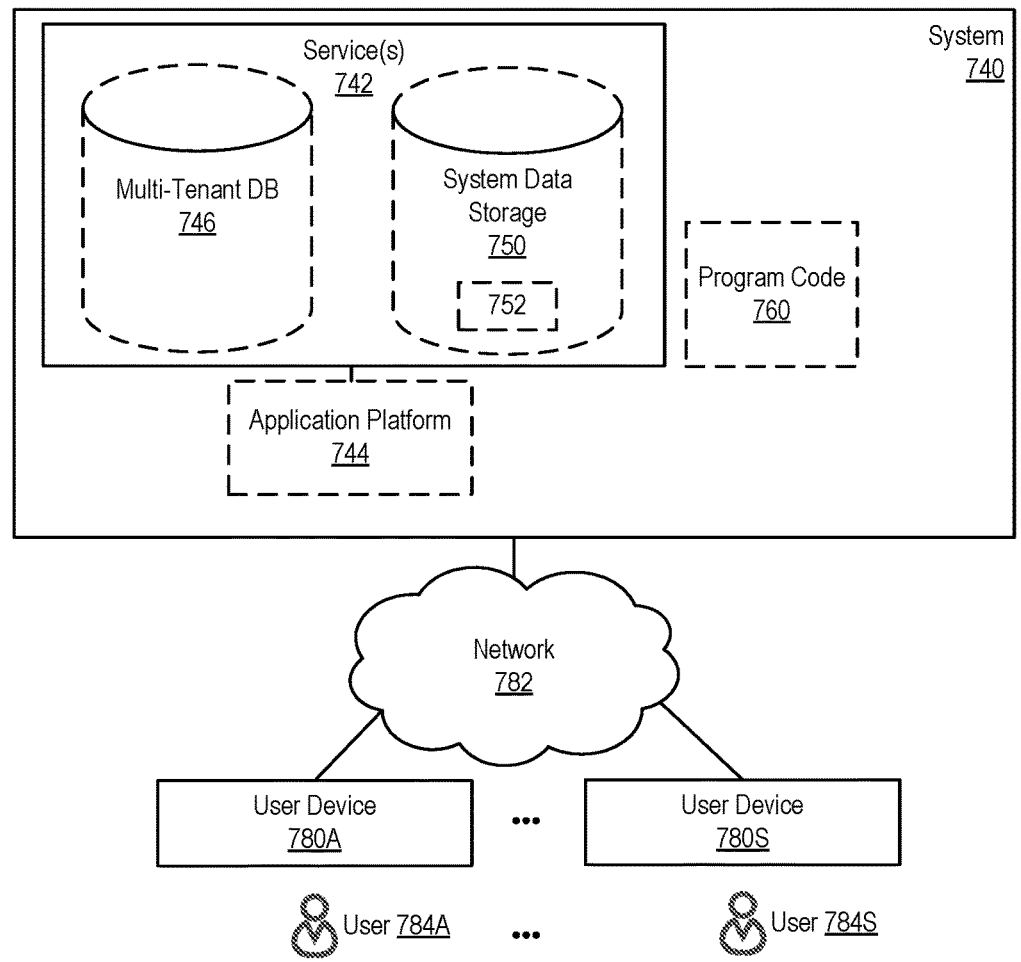
FIG. 7B is a block diagram of a deployment environment, according to some implementations.

FIG. 7B is a block diagram of a deployment environment according to some example implementations. A system 740 includes hardware (e.g., a set of one or more server devices) and software to provide service(s) 742, including the blockchain storage service. In some implementations the system 740 is in one or more datacenter(s). These datacenter(s) may be: 1) first party datacenter(s), which are datacenter(s) owned and/or operated by the same entity that provides and/or operates some or all of the software that provides the service(s) 742; and/or 2) third party datacenter(s), which are datacenter(s) owned and/or operated by one or more different entities than the entity that provides the service(s) 742 (e.g., the different entities may host some or all of the software provided and/or operated by the entity that provides the service(s) 742). For example, third party datacenters may be owned and/or operated by entities providing public cloud services (e.g., Amazon.com, Inc. (Amazon Web Services), Google LLC (Google Cloud Platform), Microsoft Corporation (Azure)).

The system 740 is coupled to user devices 780A-S over a network 782. The service(s) 742 may be on-demand services that are made available to one or more of the users 784A-S working for one or more entities other than the entity which owns and/or operates the on-demand services (those users sometimes referred to as outside users) so that those entities need not be concerned with building and/or maintaining a system, but instead may make use of the service(s) 742 when needed (e.g., when needed by the users 784A-S). The service(s) 742 may communicate with each other and/or with one or more of the user devices 780A-S via one or more APIs (e.g., a REST API). The user devices 780A-S are operated by users 784A-S.

In some implementations the system 740 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 740 is a multi-tenant cloud computing architecture supporting multiple services, such as one or more of the following:

| Type of Service | Example Service(s) by salesforce.com, inc. |
|---|---|
| Customer relationship management (CRM) | Sales Cloud |
| Configure, price, quote (CPQ) | CPQ and Billing |
| Business process modeling (BPM) | Process Builder |
| Customer support | Service Cloud, Field Service Lightning |
| Marketing | Commerce Cloud Digital, Commerce Cloud Order Management, Commerce Cloud Store |
| External data connectivity | Salesforce Connect |
| Productivity | Quip |
| Database-as-a-Service | Database.com ™ |
| Data-as-a-Service (DAAS or DaaS) | Data.com |
| Platform-as-a-service (PAAS or PaaS) | Heroku ™Enterprise, Thunder, Force.com ®, Lightning, blockchain storage service |
| Infrastructure-as-a-Service (IAAS or IaaS) (e.g., virtual machines, servers, and/or storage) | |
| Analytics | Einstein Analytics, Sales Analytics, Service Analytics |
| Community | Community Cloud, Chatter |
| Internet-of-Things (IoT) | Salesforce IoT, IoT Cloud |
| Industry-specific | Financial Services Cloud, Health Cloud |
| Artificial intelligence (AI) | Einstein |
| Application marketplace ("app store") | AppExchange, AppExchange Store Builder |
| Data modeling | Schema Builder |
| Security | Salesforce Shield |
| Identity and access management (IAM) | Field Audit Trail, Platform Encryption, IT Governance, Access Management, Salesforce Identity, Salesforce Authenticator |

For example, system 740 may include an application platform 744 that enables PAAS for creating, managing, and executing one or more applications developed by the provider of the application platform 744, users accessing the system 740 via one or more of user electronic devices 780A-S, or third-party application developers accessing the system 740 via one or more of user electronic devices 780A-S.

In some implementations, one or more of the service(s) 742 may use one or more multi-tenant databases 746, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user electronic device 780A-S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the one or more multi-tenant database 746 and/or system data storage 750.

In some implementations, the service(s) 742 are implemented using virtual applications dynamically created at run time responsive to queries from the user electronic devices 780A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the blockchain storage service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 740 and the user electronic devices 780A-S.

Each user electronic device 780A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow a user 784 to interact with various GUI pages that may be presented to a user 784. User electronic devices 780A-S might communicate with system 740 using TCP/IP (Transfer Control Protocol and Internet Protocol) and, at a higher network level, use other networking protocols to communicate, such as Hypertext Transfer Protocol (HTTP), Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 780A-S might include an HTTP client, commonly referred to as a "browser," for sending and receiving HTTP messages to and from server(s) of system 740, thus allowing users 784 of the user electronic device 780A-S to access, process and view information, pages and applications available to it from system 740 over network 782.

Conclusion

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method, comprising:
identifying a first cache object that stores events published responsive to updates, insertions, or deletions of records in a first database object, wherein an identifier for the first cache object is based on a time window with which the first cache object is associated and an identifier for the first database object;
retrieving, with the identifier for the first cache object, the events from a cache that includes the first cache object, wherein the events were stored in the first cache object during the time window; and
adding, to a blockchain, a block whose payload includes a first plurality of objects corresponding to a first subset of the events, wherein the first subset of the events includes those of the events published responsive to insertions of records in the first database object.

2. The method of claim 1, wherein the payload of the block further includes a second set of one or more objects corresponding to a second subset of the events, wherein the second subset of the events includes those of the events published responsive to updates of records in the first database object.

3. The method of claim 1, wherein the payload of the block further includes a third set of one or more objects corresponding to a third subset of the events, wherein the third subset of the events includes those of the events published responsive to deletions of records in the first database object.

4. The method of claim 1, wherein the identifying the first cache object includes retrieving, from the cache that includes the first cache object, a set of identifiers that identify cache objects that store the events, wherein the set of identifiers includes the identifier for the first cache object.

5. The method of claim 4, wherein
the cache further includes a second cache object that stores those of the events that were stored in the cache after the first cache object exceeded a size,
the set of identifiers further includes an identifier for the second cache object, and
the method further comprises retrieving, from the second cache object, those of the events that are stored in the second cache object.

6. The method of claim 1, wherein the method is performed as part of an execution of a job, wherein the job is executed at a frequency which matches a duration of the time window.

7. The method of claim 6, wherein the identifying the first cache object includes determining the identifier for the first cache object based on a time of the execution of the job and the identifier for the first database object.

8. The method of claim 1, wherein the time window corresponds to one of a time in seconds, a time in minutes, and a time in hours, at which the first cache object was created.

9. The method of claim 1, the method further comprising:
retrieving, from a source of events, other events published responsive to updates, insertions, or deletions of other records in a second database object; and
adding, to the blockchain, a plurality of blocks whose respective payloads each include an object corresponding to a respective one of the other events.

10. The method of claim 9, wherein the updates, insertions, or deletions in the second database object are less frequent than the updates, insertions, or deletions in the first database object.

11. A non-transitory machine-readable storage medium that provides instructions that, when executed by a processor, are capable of causing the processor to perform operations comprising:
identifying a first cache object that stores events published responsive to updates, insertions, or deletions of records in a first database object, wherein an identifier for the first cache object is based on a time window with which the first cache object is associated and an identifier for the first database object;
retrieving, with the identifier for the first cache object, the events from a cache that includes the first cache object, wherein the events were stored in the first cache object during the time window; and
adding, to a blockchain, a block whose payload includes a first plurality of objects corresponding to a first subset of the events, wherein the first subset of the events includes those of the events published responsive to insertions of records in the first database object.

12. The non-transitory machine-readable storage medium of claim 11, wherein the payload of the block further includes a second set of one or more objects corresponding to a second subset of the events, wherein the second subset of the events includes those of the events published responsive to updates of records in the first database object.

13. The non-transitory machine-readable storage medium of claim 11, wherein the payload of the block further includes a third set of one or more objects corresponding to a third subset of the events, wherein the third subset of the events includes those of the events published responsive to deletions of records in the first database object.

14. The non-transitory machine-readable storage medium of claim 11, wherein the identifying the first cache object includes retrieving, from the cache that includes the first cache object, a set of identifiers that identify cache objects that store the events, wherein the set of identifiers includes the identifier for the first cache object.

15. The non-transitory machine-readable storage medium of claim 14, wherein
the cache further includes a second cache object that stores those of the events that were stored in the cache after the first cache object exceeded a size,
the set of identifiers further includes an identifier for the second cache object, and
the non-transitory machine-readable storage medium further provides instructions that, when executed by the processor, are capable of causing the processor to perform further operations comprising retrieving, from the second cache object, those of the events that are stored in the second cache object.

16. The non-transitory machine-readable storage medium of claim 11, wherein the operations are performed as part of an execution of a job, wherein the job is executed at a frequency which matches a duration of the time window.

17. The non-transitory machine-readable storage medium of claim 16, wherein the identifying the first cache object includes determining the identifier for the first cache object based on a time of the execution of the job and the identifier for the first database object.

18. The non-transitory machine-readable storage medium of claim 11, wherein the time window corresponds to one of a time in seconds, a time in minutes, and a time in hours, at which the first cache object was created.

19. The non-transitory machine-readable storage medium of claim 11, wherein the non-transitory machine-readable storage medium further provides instructions that, when executed by the processor, are capable of causing the processor to perform further operations comprising:
   retrieving, from a source of events, other events published responsive to updates, insertions, or deletions of other records in a second database object; and
   adding, to the blockchain, a plurality of blocks whose respective payloads each include an object corresponding to a respective one of the other events.

20. The non-transitory machine-readable storage medium of claim 19, wherein the updates, insertions, or deletions in the second database object are less frequent than the updates, insertions, or deletions in the first database object.

* * * * *